US011973697B2

(12) United States Patent
Gray

(10) Patent No.: US 11,973,697 B2
(45) Date of Patent: *Apr. 30, 2024

(54) COMPOSING DIVERSE REMOTE CORES AND FPGAS

(71) Applicant: Gray Research LLC, Bellevue, WA (US)

(72) Inventor: Jan Stephen Gray, Bellevue, WA (US)

(73) Assignee: Gray Research LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,363

(22) Filed: Jan. 10, 2022

(65) Prior Publication Data

US 2022/0417177 A1 Dec. 29, 2022

Related U.S. Application Data

(63) Continuation of application No. 16/813,594, filed on Mar. 9, 2020, now Pat. No. 11,223,573, which is a (Continued)

(51) Int. Cl.
*H04L 12/28* (2006.01)
*G06F 13/42* (2006.01)
(Continued)

(52) U.S. Cl.
CPC ........ *H04L 49/109* (2013.01); *G06F 13/4282* (2013.01); *H04L 12/18* (2013.01); *G06F 2213/0026* (2013.01)

(58) Field of Classification Search
CPC ....... H04L 12/00; H04L 49/109; H04L 45/00; H04W 40/02
(Continued)

(56) References Cited

U.S. PATENT DOCUMENTS

| 4,933,933 A | 6/1990 | Dally et al. |
| 5,612,908 A | 3/1997 | Pechanek et al. |

(Continued)

FOREIGN PATENT DOCUMENTS

| CA | 2669464 A1 | 10/2009 |
| CN | 1669274 A | 9/2005 |

(Continued)

OTHER PUBLICATIONS

"Hoplite: FPGA Router and NOC Tools", 25th International Conference on Field-Programmable Logic and Applications, Sep. 2015, pp. 1-2, FPGA CPU News.
(Continued)

*Primary Examiner* — John Pezzlo
(74) *Attorney, Agent, or Firm* — Fogg & Powers LLC

(57) ABSTRACT

Embodiments of systems and methods for sending messages between cores across multiple field programmable gate arrays (FPGAs) and other devices are disclosed. A uniform destination address directs a message to a core in any FPGA. Message routing within one FPGA may use a bufferless directional 2D torus Network on Chip (NOC). Message routing between FPGAs may use remote router cores coupled to the NOCs. A message from one core to another in another FPGA is routed over a NOC to a local remote router then to external remote router(s) across inter-FPGA links or networks to the remote router of the second FPGA and across a second NOC to the destination core. Messages may also be multicast to multiple cores across FPGAs. A segmented directional torus NOC is also disclosed. The insertion of shortcut routers into directional torus rings achieves shorter ring segments, reducing message delivery latency and increasing NOC bandwidth.

14 Claims, 17 Drawing Sheets

Related U.S. Application Data continuation of application No. 15/945,662, filed on Apr. 4, 2018, now Pat. No. 10,587,534.

(60) Provisional application No. 62/481,662, filed on Apr. 4, 2017.

(51) Int. Cl.
  *H04L 12/18* (2006.01)
  *H04L 49/109* (2022.01)
  *H04J 1/16* (2006.01)

(58) Field of Classification Search
  USPC .......................................... 370/252, 329, 389
  See application file for complete search history.

(56) References Cited

U.S. PATENT DOCUMENTS

| | | | |
|---|---|---|---|
| 6,272,548 | B1 | 8/2001 | Cotter et al. |
| 7,007,189 | B2 | 2/2006 | Lee et al. |
| 7,219,149 | B2* | 5/2007 | Ofir .......................... H04M 11/06 709/224 |
| 7,315,877 | B2 | 1/2008 | Bhanot et al. |
| 7,568,064 | B2 | 7/2009 | Reblewski et al. |
| 7,800,401 | B1 | 9/2010 | Lewis et al. |
| 8,407,660 | B2 | 3/2013 | Solomon |
| 8,631,205 | B1 | 1/2014 | Wentzlaff et al. |
| 8,812,287 | B2 | 8/2014 | Barus |
| 9,742,630 | B2* | 8/2017 | Philip ...................... H04L 45/06 |
| 10,116,557 | B2 | 10/2018 | Gray et al. |
| 10,419,338 | B2 | 9/2019 | Gray |
| 10,587,534 | B2 | 3/2020 | Gray |
| 2002/0177990 | A1 | 11/2002 | Sample |
| 2003/0088754 | A1 | 5/2003 | Barry et al. |
| 2003/0223581 | A1 | 12/2003 | Hanounik |
| 2004/0250046 | A1 | 12/2004 | Gonzalez et al. |
| 2005/0050233 | A1 | 3/2005 | Anjo et al. |
| 2005/0138276 | A1 | 6/2005 | Navada et al. |
| 2008/0229059 | A1 | 9/2008 | May |
| 2009/0108906 | A1 | 4/2009 | Butler |
| 2009/0125574 | A1 | 5/2009 | Mejdrich et al. |
| 2009/0257360 | A1 | 10/2009 | Patel et al. |
| 2011/0243147 | A1 | 10/2011 | Paul |
| 2012/0020245 | A1* | 1/2012 | Moeller ................ H04W 40/02 370/254 |
| 2013/0108264 | A1 | 5/2013 | deRuijter et al. |
| 2013/0160026 | A1 | 6/2013 | Kuesel et al. |
| 2014/0091878 | A1 | 4/2014 | Bila et al. |
| 2014/0108596 | A1* | 4/2014 | Frerking ................. H04L 67/02 709/217 |
| 2014/0177626 | A1 | 6/2014 | Thottethodi et al. |
| 2014/0376557 | A1 | 12/2014 | Park et al. |
| 2015/0113184 | A1 | 4/2015 | Stanford-Jason et al. |
| 2015/0331831 | A1 | 11/2015 | Solihin |
| 2016/0344629 | A1 | 11/2016 | Gray |
| 2017/0063625 | A1 | 3/2017 | Philip et al. |
| 2017/0171111 | A1 | 6/2017 | Khare et al. |
| 2017/0220499 | A1 | 8/2017 | Gray |
| 2019/0028387 | A1 | 1/2019 | Gray |
| 2020/0213245 | A1 | 7/2020 | Gray |
| 2020/0259743 | A1 | 8/2020 | Gray |
| 2021/0160177 | A1 | 5/2021 | Gray |

FOREIGN PATENT DOCUMENTS

| | | |
|---|---|---|
| CN | 103380598 A | 10/2013 |
| WO | 2013033832 A1 | 3/2013 |
| WO | 2013119241 A1 | 8/2013 |
| WO | 2016191304 A1 | 12/2016 |
| WO | 2017120270 A1 | 7/2017 |

OTHER PUBLICATIONS

"The Past and Future of FPGA Soft Processors", FPGA CPU News, Dec. 31, 2014, pp. 1-2, fpga.org.

China Intellectual Property Administration, "First Office Action from CN Application No. 201680041674.3 dated Feb. 20, 2019", from Foreign Counterpart to U.S. Appl. No. 14/986,532, pp. 1-14, Published: CN.

China National Intellectual Property Administration, "Decision on Rejection from CN Application No. 201680041674.3", from Foreign Counterpart to U.S. Appl. No. 14/986,532, dated Apr. 3, 2020, pp. 1 through 8, Published: CN.

China National Intellectual Property Administration, "First Office Action from CN Application No. 202010685340.8", from Foreign Counterpart to U.S. Appl. No. 14/986,532, dated Mar. 3, 2021, pp. 1 through 13, Published: CN.

China National Intellectual Property Administration, "Second Office Action from CN Application No. 201680041674.3", from Foreign Counterpart to U.S. Appl. No. 14/986,532, dated Oct. 9, 2019, pp. 1-15, Published: CN.

China National Intellectual Property Administration, P.R. China, "Notice on the Second Office Action from CN Application No. 202010685340.8", dated Dec. 2, 2021 from Foreign Counterpart to U.S. Appl. No. 15/395,701, pp. 1 through 10, Published: CN.

European Patent Office, "Communication pursuant to Article 94(3) EPC from EP Application No. 16726752.5", from Foreign Counterpart to U.S. Appl. No. 14/986,532, dated Apr. 26, 2021, pp. 1 through 4, Published: EP.

European Patent Office, "Communication pursuant to Article 94(3) from EP Application No. 16726752.5", from Foreign Counterpart to U.S. Appl. No. 14/986,532, dated Jun. 12, 2020, pp. 1 through 4, Published: EP.

European Patent Office, "Communication pursuant to Rule 164(2)(b) and Article 94(3) from EP Application No. 16726752.5 dated Jun. 21, 2019", from Foreign Counterpart to U.S. Appl. No. 14/986,532, pp. 1-13, Published: EP.

European Patent Office, "Communication under Rule 164(2)(a) from EP Application No. 16726752.5 dated Mar. 18, 2019", from Foreign Counterpart to U.S. Appl. No. 14/986,532, pp. 1-5, Published: EP.

Gray, "Multiprocessors, Jan's Razor, resource sharing, and all that", FPGA CPU News of Mar. 2002, Mar. 5, 2002, pp. 1-4, fpgacpu.org.

International Bureau, "International Preliminary Report on Patentability from PCT Application No. PCT/US2016/033618 dated Dec. 7, 2017", from Foreign Counterpart to U.S. Appl. No. 14/986,532, pp. 1-14, Published: WO.

International Bureau, "International Preliminary Report on Patentability from PCT Patent Application No. PCT/US2017/012230 dated Jul. 19, 2018", "from Foreign Counterpart of U.S. Appl. No. 15/398,701", dated Jul. 19, 2018, pp. 1-11, Published in: WO.

International Searching Authority, "Corrected Page of International Searching Authority (dated Jun. 8, 2017) from PCT Application No. PCT/US2017/012230 dated Jun. 29, 2017", from Foreign Counterpart to U.S. Appl. No. 15/398,701, dated Jun. 29, 2017, pp. 1-2, Published: WO.

International Searching Authority, "Invitation to Pay Additional Fees from PCT Application No. PCT/US2016/033618 dated Aug. 8, 2016", from Foreign Counterpart to U.S. Appl. No. 14/986,532, dated Aug. 8, 2016, pp. 1-8, Published: EP.

International Searching Authority, "Invitation to Pay Additional Fees from PCT Application No. PCT/US2017/012230 dated Apr. 13, 2017", from Foreign Counterpart to U.S. Appl. No. 15/398,701, dated Apr. 13, 2017, pp. 1-8, Published: EP.

International Searching Authority, "Notification of Transmittal of the International Search Report and Written Opinion of the International Searching Authority from PCT Application No. PCT/US2017/012230 dated Jun. 8, 2017", from Foreign Counterpart to U.S. Appl. No. 15/398,701, Jun. 8, 2017, pp. 1-18, Published: EP.

International Searching Authority, "Notification of Transmittal of the International Search Report and Written Opinion of the International Searching Authority from PCT Application No. PCT/US2016/033618 dated Sep. 30, 2016", from Foreign Counterpart to U.S. Appl. No. 14/986,532, Sep. 30, 2016, pp. 1-19, Published: EP.

(56) References Cited

OTHER PUBLICATIONS

Krishna et al., "Towards the Ideal On-chip Fabric for 1-to-Many and Many-to-1 Communication", 2011, pp. 71-82, ACM.

Ma et al., "Supporting Efficient Collective Communication in NoCs", 2011, pp. 1-12, IEEE.

U.S. Patent and Trademark Office, "Corrected Notice of Allowability", U.S. Appl. No. 16/140,536, dated May 22, 2019, pp. 1-10, Published: US.

U.S. Patent and Trademark Office, "Final Office Action", U.S. Appl. No. 15/398,701, dated Jan. 29, 2021, pp. 1 through 48, Published: US.

U.S. Patent and Trademark Office, "Final Office Action", U.S. Appl. No. 15/398,701, dated Aug. 16, 2019, pp. 1-49, Published: US.

U.S. Patent and Trademark Office, "Notice of Allowance", U.S. Appl. No. 14/986,532, dated Jun. 18, 2018, pp. 1-19, Published: US.

U.S. Patent and Trademark Office, "Notice of Allowance", U.S. Appl. No. 15/945,662, dated Oct. 28, 2019, pp. 1-20, Published: US.

U.S. Patent and Trademark Office, "Notice of Allowance", U.S. Appl. No. 16/140,536, dated May 3, 2019, pp. 1-17, Published: US.

U.S. Patent and Trademark Office, "Notice of Allowance", U.S. Appl. No. 16/572,455, dated Sep. 30, 2020, pp. 1 through 35, Published: US.

U.S. Patent and Trademark Office, "Notice of Allowance", U.S. Appl. No. 16/813,594, dated Sep. 2, 2021, pp. 1 through 50, Published: US.

U.S. Patent and Trademark Office, "Office Action", U.S. Appl. No. 14/986,532, dated Aug. 29, 2017, pp. 1-32, Published: US.

U.S. Patent and Trademark Office, "Office Action", U.S. Appl. No. 15/398,701, dated Apr. 28, 2020, pp. 1 through 54, Published: US.

U.S. Patent and Trademark Office, "Office Action", U.S. Appl. No. 15/398,701, dated Aug. 23, 2021, pp. 1 through 49, Published: US.

U.S. Patent and Trademark Office, "Office Action", U.S. Appl. No. 15/398,701, dated Nov. 19, 2018, pp. 1-52, Published: US.

U.S. Patent and Trademark Office, "Office Action", U.S. Appl. No. 15/945,662, dated Apr. 8, 2019, pp. 1-7, Published: US.

U.S. Patent and Trademark Office, "Final Office Action", U.S. Appl. No. 15/398,701, dated May 17, 2022, pp. 1 through 49, Published: US.

U.S. Patent and Trademark Office, "Notice of Allowance", U.S. Appl. No. 17/164,726, dated Feb. 13, 2023, pp. 1 through 10, Published: US.

U.S. Patent and Trademark Office, "Office Action", U.S. Appl. No. 17/164,726, dated Jul. 22, 2022, pp. 1 through 59, Published: US.

\* cited by examiner

COMPOSING DIVERSE REMOTE CORES AND FPGAS

CROSS-RELATED APPLICATIONS/PRIORITY CLAIM

This application is a continuation of U.S. patent application Ser. No. 16/813,594, entitled SHORTCUT ROUTING ON SEGMENTED DIRECTIONAL TORUS INTERCONNECTION NETWORKS, filed Mar. 9, 2020, which is a continuation of U.S. patent application Ser. No. 15/945,662, entitled COMPOSING CORES AND FPGAS AT MASSIVE SCALE WITH DIRECTIONAL, TWO DIMENSIONAL ROUTERS AND INTERCONNECTION NETWORKS, filed Apr. 4, 2018, which claims the benefit of priority from U.S. Provisional Patent Application Ser. No. 62/481,662, entitled COMPOSING CORES AT CLUSTER, DATACENTER, AND PLANETARY SCALE WITH DIRECTIONAL, TWO DIMENSIONAL ROUTERS AND INTERCONNECTION NETWORKS FOR FIELD PROGRAMMABLE GATE ARRAYS, AND OTHER APPLICATIONS AND TOOLS, filed Apr. 4, 2017, the contents of which are incorporated herein by reference.

This application is related to U.S. patent application Ser. No. 15/398,701 filed on Jan. 4, 2017, entitled MASSIVELY PARALLEL COMPUTER, ACCELERATED COMPUTING CLUSTERS, AND TWO-DIMENSIONAL ROUTER AND INTERCONNECTION NETWORK FOR FIELD PROGRAMMABLE GATE ARRAYS, AND APPLICATIONS, which claims the benefit of U.S. Provisional Patent Application Ser. No. 62/274,745 filed on Jan. 4, 2016, entitled "MASSIVELY PARALLEL COMPUTER AND DIRECTIONAL TWO-DIMENSIONAL ROUTER AND INTERCONNECTION NETWORK FOR FIELD PROGRAMMABLE GATE ARRAYS AND OTHER CIRCUITS AND APPLICATIONS OF THE COMPUTER, ROUTER, AND NETWORK", and which also claims the benefit of U.S. Provisional Patent Application Ser. No. 62/307,330 filed on Mar. 11, 2016, entitled "MASSIVELY PARALLEL COMPUTER AND DIRECTIONAL TWO-DIMENSIONAL ROUTER AND INTERCONNECTION NETWORK FOR FIELD PROGRAMMABLE GATE ARRAYS AND OTHER CIRCUITS AND APPLICATIONS OF THE COMPUTER, ROUTER, AND NETWORK", all of which are hereby incorporated herein by reference.

This application is related to U.S. patent application Ser. No. 14/986,532, entitled "DIRECTIONAL TWO-DIMENSIONAL ROUTER AND INTERCONNECTION NETWORK FOR FIELD PROGRAMMABLE GATE ARRAYS, AND OTHER CIRCUITS AND APPLICATIONS OF THE ROUTER AND NETWORK," which was filed 31 Dec. 2015 and which claims priority to U.S. Patent App. Ser. No. 62/165,774, which was filed 22 May 2015. These related applications are incorporated by reference herein.

This application is related to PCT/US2016/033618, entitled "DIRECTIONAL TWO-DIMENSIONAL ROUTER AND INTERCONNECTION NETWORK FOR FIELD PROGRAMMABLE GATE ARRAYS, AND OTHER CIRCUITS AND APPLICATIONS OF THE ROUTER AND NETWORK," which was filed 20 May 2016, and which claims priority to U.S. Patent App. Ser. No. 62/165,774, which was filed on 22 May 2015, U.S. patent application Ser. No. 14/986,532, which was filed on 31 Dec. 2015, U.S. Patent App. Ser. No. 62/274,745, which was filed 4 Jan. 2016, and U.S. Patent Application Ser. No. 62/307,330, which was filed 11 Mar. 2016. These related applications are incorporated by reference herein.

This application is related to PCT/US2017/012230 entitled "MASSIVELY PARALLEL COMPUTER, ACCELERATED COMPUTING CLUSTERS, AND TWO DIMENSIONAL ROUTER AND INTERCONNECTION NETWORK FOR FIELD PROGRAMMABLE GATE ARRAYS, AND APPLICATIONS," which claims the benefit of U.S. Provisional Patent Application Ser. No. 62/307,330 filed on Mar. 11, 2016, entitled "MASSIVELY PARALLEL COMPUTER AND DIRECTIONAL TWODIMENSIONAL ROUTER AND INTERCONNECTION NETWORK FOR FIELD PROGRAMMABLE GATE ARRAYS AND OTHER CIRCUITS AND APPLICATIONS OF THE COMPUTER, ROUTER, AND NETWORK", both of which are hereby incorporated herein by reference.

TECHNICAL FIELD

The present disclosure relates generally to electronic circuits, and relates more specifically to, e.g., interconnection-network design, field programmable gate array (FPGA) design, computer architecture, datacenter architecture, parallel computing, cloud computing, and electronic design automation tools.

DESCRIPTION OF THE RELATED ART

The present disclosure pertains to the design and implementation of network-on-chip ("NOC") interconnection networks for efficient implementation in programmable logic in FPGAs, and using these NOC networks in multiple FPGAs to achieve efficient and flexible composition of and intercommunication with systems of hundreds, thousands, even millions of cores, implemented in one or more (tens, hundreds, thousands, or more) FPGAs.

The rise of cloud computing has seen deployment of planetary scale distributed computing, with datacenters connected by ultra-high bandwidth networks, and within a datacenter, hundreds of thousands of computer nodes interconnected with a forest of network routers and switches, such that any processor or storage/PO device in one node in a datacenter may communicate over this network fabric with any other processor or storage/I/O device node elsewhere in the data center, or in any datacenter.

Over time, datacenters have evolved to include GPU-attached processors to take advantage of GPU-optimized GPU-accelerated computing. These GPU accelerated processors similarly can be composed into cloud scale computing fabrics.

Compared to general purpose processors and GPUs, FPGAs (field programmable gate arrays) may be configured to implement certain functions including computing tasks faster, with higher throughput, or with lower energy, and accordingly multiple cloud, datacenter, and high performance computing centers now include FPGAs in their mix of computing devices.

One architecture for integrating FPGAs into a networked datacenter is to introduce an FPGA as a "bump in the wire" network connection between each host CPU and its NIC (network interface) and the TOR (top of rack switch). The FPGA has two network interfaces, one to the host NIC, one to the TOR. Here, all packets between host and datacenter traverse the FPGA. The FPGA can filter and transform data exchanged between host and the datacenter. It can also send and receive its own network packets to the host, or to the datacenter, and thereby multiple FPGAs can exchange data using the datacenter network infrastructure.

Another architecture for integrating FPGAs into a networked datacenter is to provide a cluster of FPGAs as an attached computing resource to a host CPU. The cluster of FPGAs may communicate with their host CPU using point-to-point PCIe (PCI-Express) interfaces, or may connect together by means of a PCIe switch, which allows data to be read/written to the host or any FPGA on the switch. Furthermore the cluster of FPGAs may be connected by dedicated external point-to-point links between FPGAs, which may form various interconnect topologies such as a ring, fully connected graph, torus, etc.

Because FPGAs run at lower frequencies (hundreds of MHz) compared to CPUs and GPUs, FPGAs accelerate computation by use of spatial parallelism—implementing a computation in a deep pipeline, or via multiple parallel instantiations of a core (circuit, logic function), so that thousands of results are computed each cycle across the FPGA across thousands of cores. Furthermore FPGAs may also have many very high-bandwidth interfaces and input/output (I/O) channels, which are managed by I/O interface cores, and which exchange data with other compute and I/O cores.

It is a challenge to implement, within one FPGA, a feasible, scalable, efficient interconnection network so that high-speed data may flow at full bandwidth (i.e., capable of transmission of data at the maximum data rate at which a source core (circuit) may produce it or at which a destination core may consume it) between and amidst many client cores and the external interface cores. Method and apparatus to do so are described in cited applications U.S. patent application Ser. No. 14/986,532 and PCT/US2016/033618.

When a computation needs to scale "way up" and, as a result, uses the resources of multiple FPGAs, it is similarly a challenge to compose thousands or millions of cores across the FPGAs to achieve efficient, robust, and uniform addressing and communication between the myriad cores. Working at this scale requires a means by which any one core in one FPGA can efficiently communicate, not just with another core in that FPGA, but just as efficiently and conveniently, with another core in another FPGA, anywhere in the local FPGA cluster, the whole datacenter, or the entire cloud.

Another challenge for FPGA system design is to support interconnection of client cores into massively parallel systems when some messages have a high fan out, e.g., copies of some messages are desired to be sent to many destination client cores—across one FPGA, or across the cluster, datacenter, or cloud of FPGAs—but sending so many individual messages is prohibitive. Multicast messages, which are each delivered to a plurality of client cores approximately simultaneously, have been proposed for other domains, but there is no multiple FPGA NOC system which can concurrently deliver any mix of both arbitrary point-to-point messages and high-fan-out X-, Y-, and XY-multicast (broadcast) messages, across cluster, datacenter, or entire cloud.

Related Art in Multiple FPGA Cloud Computing Systems

The Microsoft Catapult v2 cloud design includes FPGAs as "SmartNICs" implementing the bump-in-the-wire interconnection described above. [1]

The Amazon Web Services (AWS) Elastic Compute Cloud (EC2) FPGA instance (F1 instance) design includes, in the f1.16xlarge configuration, a cluster of host CPU(s) and eight FPGAs, interconnected with host and each other on a PCIe switch, and interconnected with each other on an external ring interconnect, described as having a bandwidth of 400 Gb/s/link. [2]

Both Catapult and F1 designs include "shell" logic that provides host and inter-FPGA communication. With Catapult, communication is over the IP network; with F1 it is via the PCIe switch and FPGA ring link I/Os.

REFERENCES

The following references are incorporated herein by reference.

[1] A Cloud Scale Acceleration Architecture, A. Caulfield et al, IEEE Micro, October 2016.
[2] Amazon AWS EC2 F1 Instances, [web link] aws.amazon.com
[3] J. Gray, "GRVI Phalanx: A Massively Parallel RISC-V FPGA Accelerator Accelerator," 2016 IEEE 24th Annual International Symposium on Field-Programmable Custom Computing Machines (FCCM), Washington, D C, 2016, pp. 17-20. doi: 10.1109/FCCM.2016.12

SUMMARY

Whereas existing systems afford basic inter-FPGA connectivity over a network or over dedicated links within an FPGA cluster, they do not afford or facilitate arbitrary connectivity and communication with hundreds of cores within one FPGA as well as with thousands or millions of such cores across multiple FPGAs in a cluster, datacenter, or cloud. In contrast to prior-art systems, the system disclosed herein implements a practical means to connect and communicate amongst myriad cores, including computing and I/O interface cores, across one or multiple FPGAs, in a cluster, datacenter, or cloud.

The present disclosure composes FPGA-efficient directional, two dimensional network-on-chip (NOC) technology, known herein as Hoplite routers and Hoplite NOCs, herein cited, with disclosed Remote Router cores, and with inter-FPGA communication links. Examples of Hoplite routers and Hoplite NOCs are described in U.S. patent application Ser. No. 14/986,532, filed on Dec. 31, 2015, entitled DIRECTIONAL TWO-DIMENSIONAL ROUTER AND INTERCONNECTION NETWORK FOR FIELD PROGRAMMABLE GATE ARRAYS, AND OTHER CIRCUITS AND APPLICATIONS OF THE ROUTER AND NETWORK, which claims priority to U.S. Provisional Pat. App. Ser. No. 62/165,774, filed May 22, 2015; both of these applications are incorporated by reference herein. A Hoplite NOC provides a uniform addressing mechanism by which any core in any FPGA may identify and communicate with any other core in any other FPGA. A Hoplite NOC provides a uniform way to send point-to-point messages and one-to-many multicast messages, across many cores across many FPGAs. And since certain I/O cores interface to hosts, network controllers, memory (coupled RAM and disaggregated network RAM), and storage (SSD, NVMe, disk), a Hoplite NOC similarly allows any FPGA core to communicate with diverse remote non-FPGA computing resources.

In effect the disclosure enables practical internetworking of arbitrary cores at arbitrary scale.

The many features of embodiments of the disclosure, include, without limitation:
1) a system to send a message from a core in one FPGA to any core in that FPGA or any other FPGA;

2) a system to send a multicast message from a core in one FPGA to more than one core in another FPGA or to one or more cores in multiple FPGAs;
3) a remote router that is optimized for and coupled to the NOC and with external I/O interfaces such as direct links, PCIe links, PCIe switches, and IP networking, bridging the remote and the local, responsible for forwarding messages from remote or local sources towards remote or local destinations;
4) a common and uniform remote destination address representation, used by both NOC routers and remote routers, facilitating uniform and composable messaging at any scale of local NOC destinations or destinations on remote devices (including FPGAs), cluster, datacenter, or cloud.
5) an enhanced and more scalable on-chip bufferless directional 2D torus NOC with ring shortcut routers for lower message delivery latency and higher NOC bandwidth when used with large NOCs with large diameter rings;
6) A four-terminal (2-messages-in, 2-messages-out) message shortcut router switch that is FPGA-efficient by technology mapping two switch outputs to each LUT (particularly a Xilinx 6-LUT or an Intel-Altera ALM);
7) the many benefits of the base (one FPGA) Hoplite NOC and router system, but applied to multi-FPGA systems, including:
  7.1. a system with configurable and flexible routers, links, and NOCs;
  7.2. a NOC in which the routing function is reconfigurable;
  7.3. a NOC with mutable message metadata;
  7.4. a NOC with configurable multicast-message-delivery support;
  7.5. a NOC client interface, supporting atomic message send and receive each cycle, with NOC and client-flow control;
  7.6. a configurable NOC floor-planning system;
  7.7. a NOC configuration specification language;
  7.8. a NOC generation tool to generate a workload-specific NOC design from a NOC configuration specification, including, without limitation, synthesizable hardware-definition-language code, simulation test bench, FPGA floor-plan constraints, FPGA implementation constraints, and documentation.
8) Diverse applications of the NOC as described herein below.

The disclosed multi-FPGA message format 272 further includes a remote-FPGA indicator 'w' and other data. Alternative disclosed multi-FPGA message format 272 encapsulates a remote message within a local message and may be used by a source client core to specify the specific local NOC router endpoint of a specific remote router tasked with forwarding the message to a remote FPGA.

The disclosed multi-FPGA message format 274 encapsulates a remote message within a local message, i.e., treating the remote message as payload data of a local message, enabling a local client core to send a message to a remote client via a specific remote router coupled to a specific local NOC router on the local NOC.

Figure 2A:
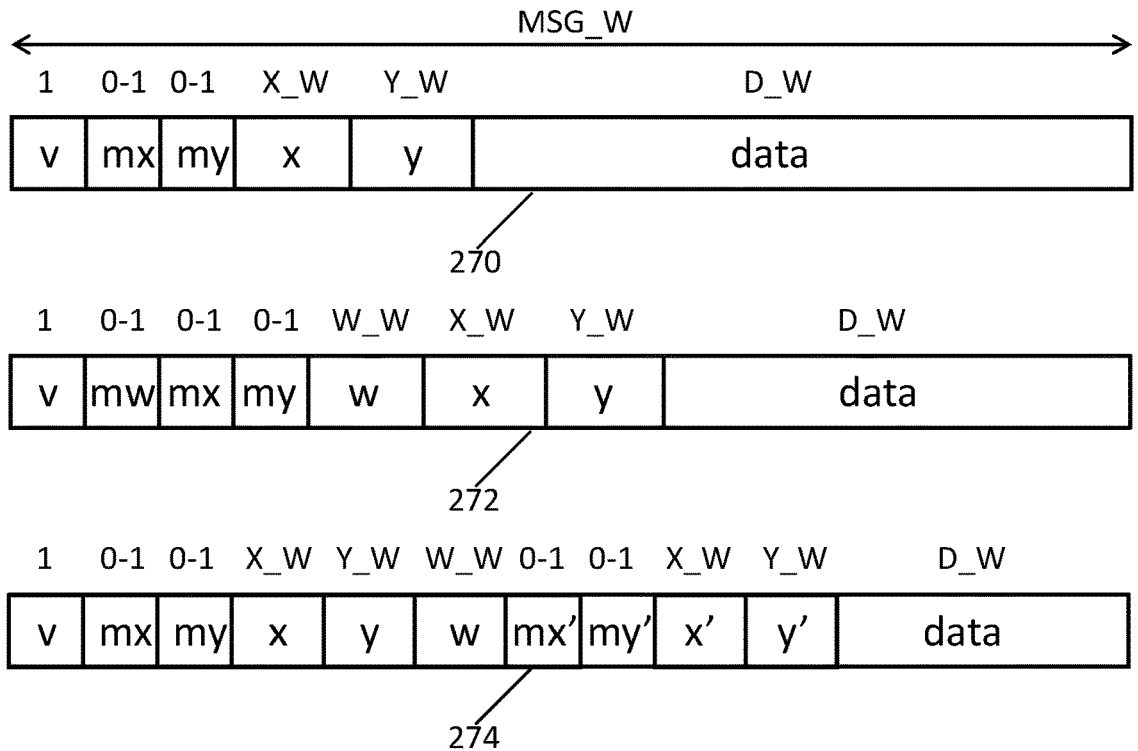
FIG. 2A is a diagram of an embodiment of several Hoplite NOC message formats. The base message format 270 includes a first-dimension address 'x', a second-dimension address 'y', a data payload 'data,' and optionally other information such as a message-valid indicator 'v'. In an embodiment, format 270 specifies a destination on the local NOC. In an embodiment, format 270 may also specify a destination in a remote NOC in a remote FPGA, when first and second dimension address coordinates in the remote NOC are disjoint from those in the local NOC.
Figure 2B:
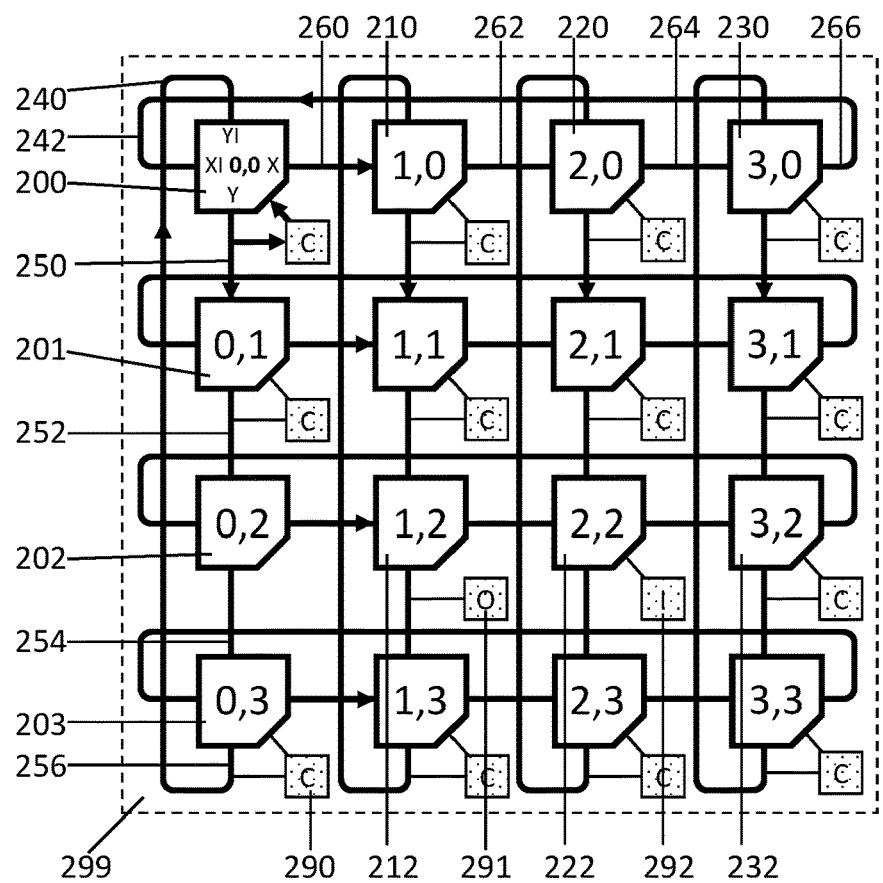

FIG. 2B is a diagram of an embodiment of a Hoplite NOC 299. The NOC 299 includes a 4×4 torus of 2D routers including routers 200, 201, 202, 203, 210, 212, 220, 222, 230, 232, which intercouple client cores 290, 291, 292 via unidirectional dimensional rings 240, 242, which rings comprise unidirectional links 260, 252, 256, 256, 260, 262, 264, 266. A router 200 includes message inputs, message outputs, and a router circuit described herein below. Router inputs include two-dimensional message inputs designated XI and YI. Router outputs include two-dimensional output links designated X and Y. Router inputs may further include a client-core message input designated I. A client 290 receives output from a router 203 by sharing the second dimension Y output link 256 with the next router 200 in the same Y ring 240. A router 203 may have a client 290, which sends and receives messages into the NOC 299, or a router 212 may have an output-only client 291, which receives messages only from the NOC 299, or a router 222 may have an input-only client 292, which inputs messages only into the NOC 299, or a router 202 may have no direct connection to any client.

Figure 3:
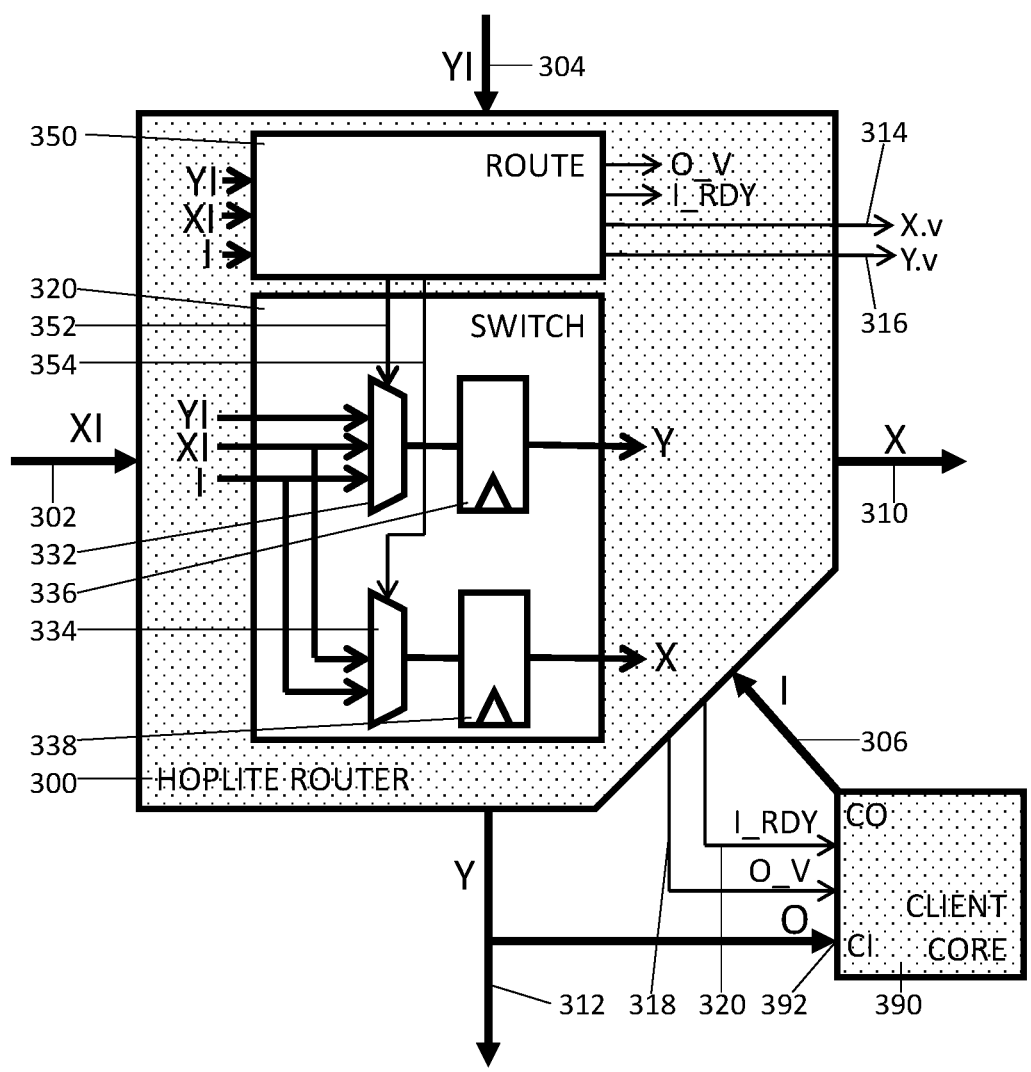

FIG. 3 is a diagram of a subcircuit of an embodiment of a NOC 299, which includes one router 300 coupled to one client core 390. A router 300 includes message inputs, message outputs, validity outputs, a routing circuit 350, and a switch circuit 330. Message inputs include a first-dimension message input 302, which is designated XI, and a second-dimension message input 304, which is designated YI. Message inputs may also include a client-message input 306, which is designated I. Message outputs include a first-dimension message output 310, which is designated X, and a second-dimension message output 312, which is designated Y. Validity outputs include an X-valid indicator line 314, which is configured to carry a signal that indicates that the X-output message is valid, a Y-valid indicator line 316, which is configured to carry a signal that indicates that the Y-output message is valid, an output-valid indicator line 318, which is designated O_V and which is configured to carry a signal that indicates that the Y-output message is a valid client-output message, and an input-ready indicator line 320, which is designated I_RDY and which is configured to carry a signal that indicates that the router 300 has accepted the client core 390's input message this cycle.

Figure 4:
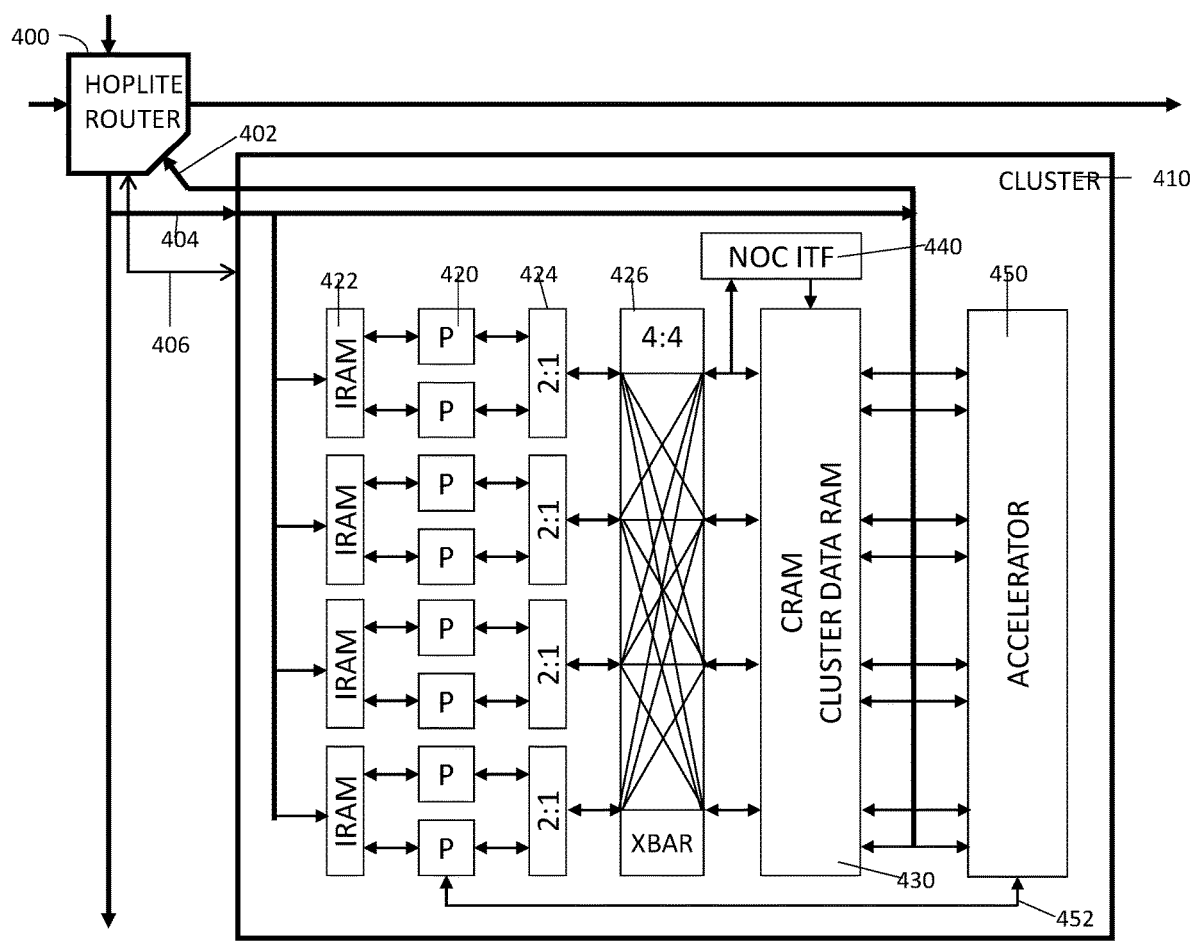

FIG. 4 is a diagram of an embodiment of an accelerated multiprocessor cluster 410 which is an exemplary client core 149 of SOC 102. Cluster 410 connects to and communicates with the rest of the system by sending and receiving messages on 2D directional torus 'Hoplite' router 400, coupled to neighboring upstream and downstream Hoplite routers (not shown) on its X and Y rings. Here cluster 210 includes eight soft processor cores 420, which share access to a cluster RAM (CRAM) 430, which, in turn, is connected to a shared accelerator core 450, and to the router 400 to send and receive messages over the NOC. In an exemplary FPGA computing system described herein, the system includes two hundred ten (210) such tiles, or one thousand six hundred eighty (1680) processors in all. The NOC is used to by the processors and accelerator to carry data between clusters, between clusters and external interface cores (for example to load or store to external DRAM), directly between external interface cores, and in particularly, to send or receive messages via the FPGA 100's remote router 180 to/from remote client cores on remote client NOCs on remote client FPGAs.

Figure 5:
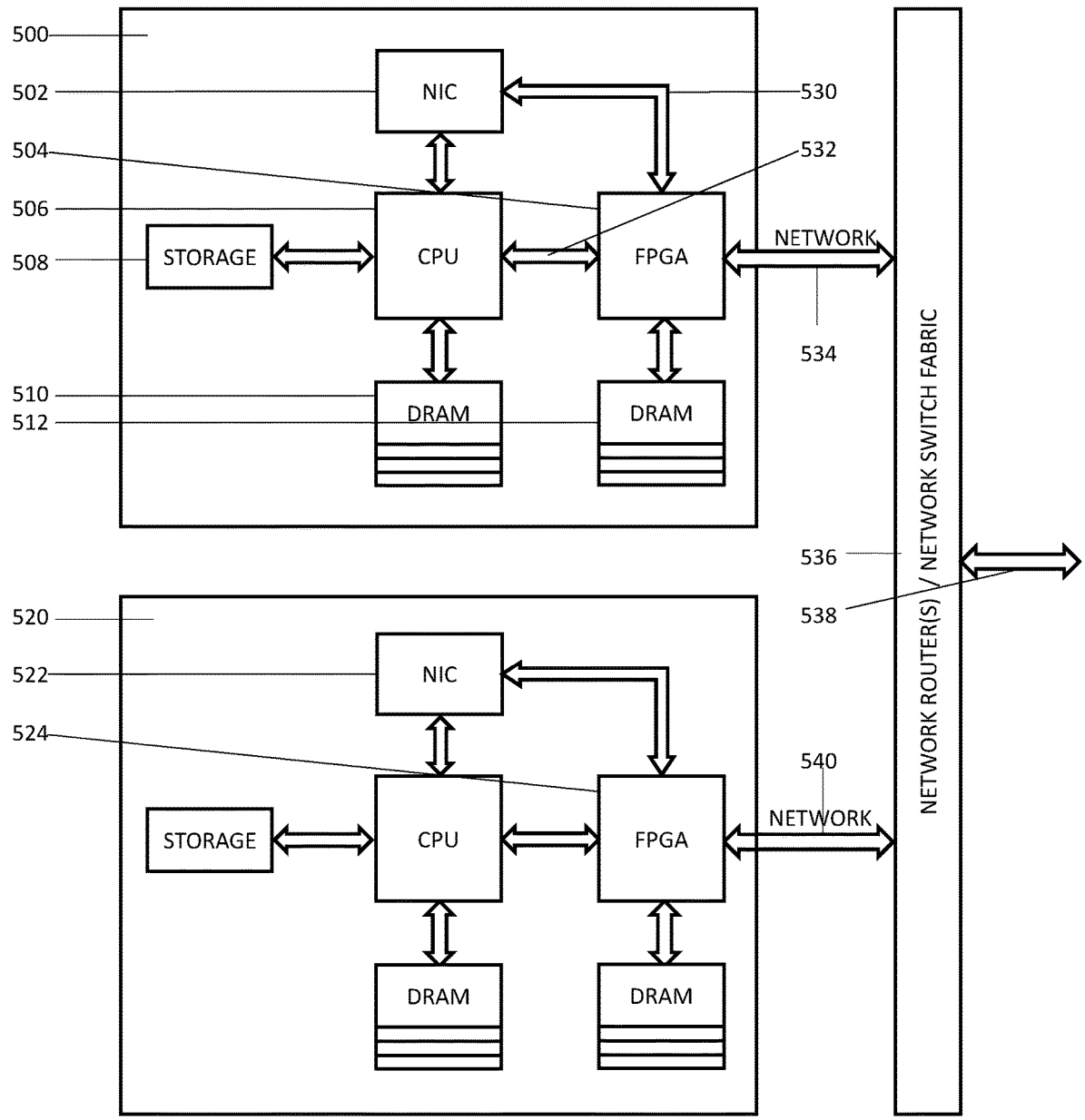

FIG. 5 is a diagram of an embodiment of a multi-FPGA SmartNIC system integrating FPGAs as a "bump in the wire." Node 500 includes host CPU 506, FPGA 504, NIC 502, storage 508 and host DRAM 510 and FPGA DRAM 512. CPU 506 is configured to send/receive IP packets via NIC 502, which packets are routed on network 530 to the FPGA 504. CPU 506 is configured to connect to FPGA 504 via PCIe link 532. FPGA 504 is configured to send/receive IP packets via network 530 to/from the NIC and via network 534 to/from the network router 536. Similarly in second node 520, FPGA 524 is configured to communicate on IP network with NIC 522 and with network router 536. The IP network typically is configured to connect upstream to the rest of the datacenter network switch fabric and the global internet on IP network link 538.

Figure 6A:
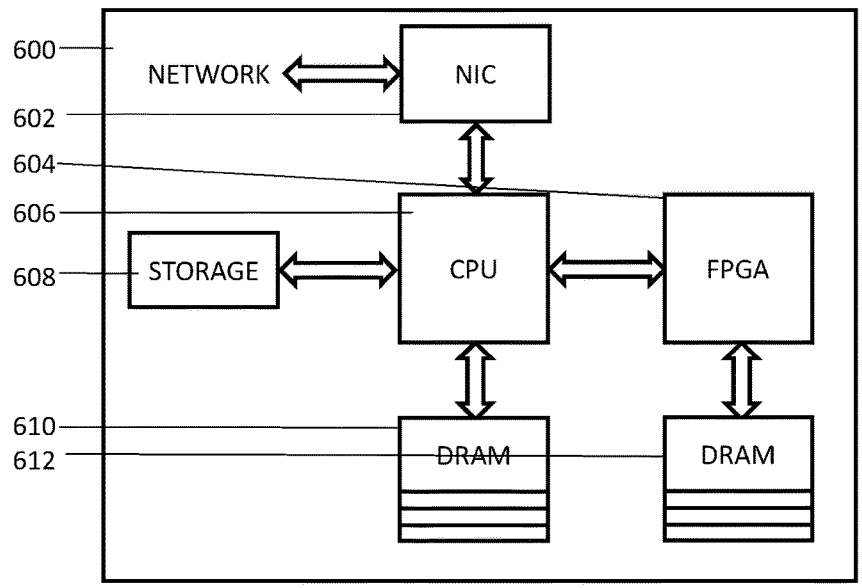

FIG. 6A is a diagram of an embodiment of a simple FPGA-attached computing system 600 including host CPU 606, FPGA 604, NIC 602, host DRAM 610, and FPGA DRAM 612.

Figure 6B:
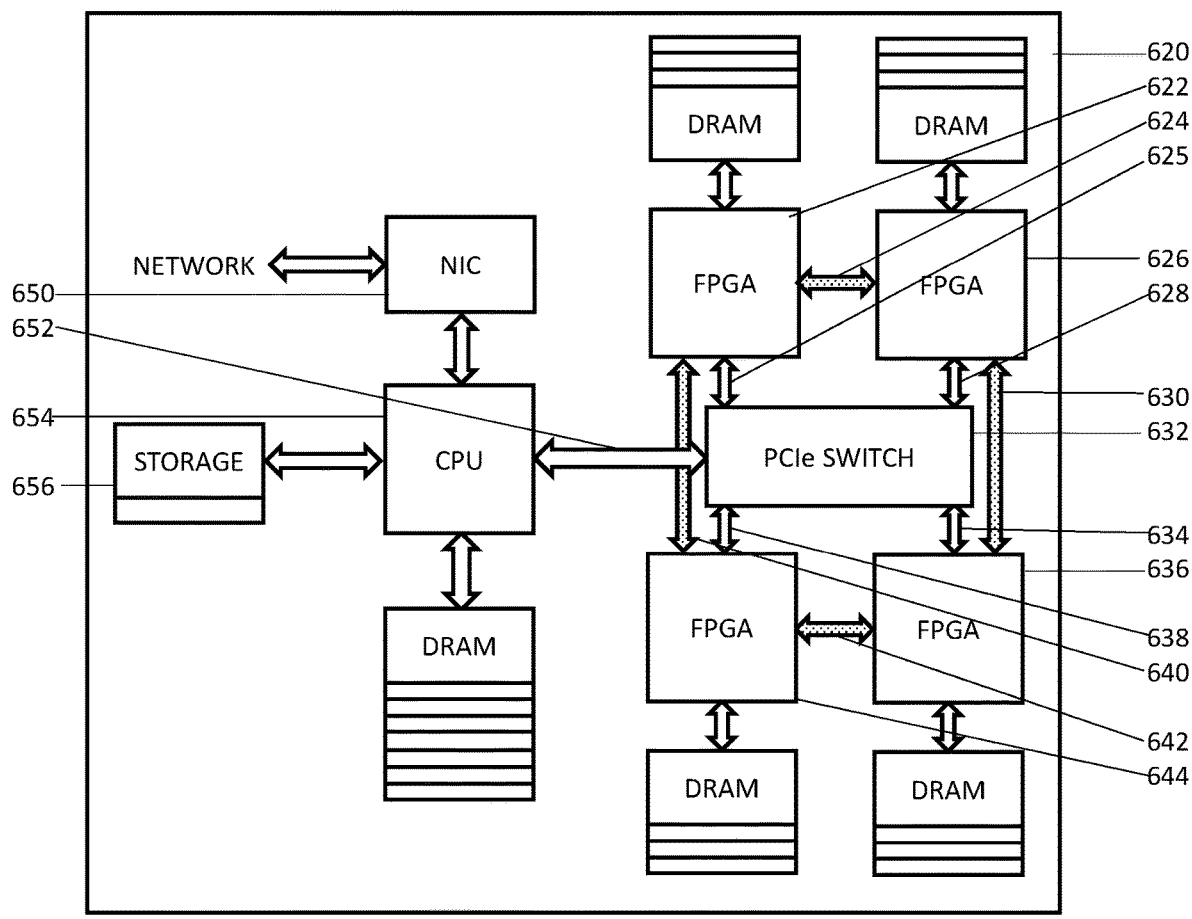

In contrast, FIG. 6B is a diagram of an embodiment of a cluster FPGA computing system 620, including a host CPU 654 and attached FPGAs 622, 626, 636, and 644. These four FPGAs are configured to communicate with the host 654 via PCIe link 652 directly (not shown) or by means of a PCIe switch 632. PCIe switch 632 is capable of carrying PCIe traffic between host 654 and some FPGA, and also directly between one FPGA and another FPGA via PCIe links 625, 628, 634, and 638. For example PCIe link 625 is configured to carry PCIe traffic between FPGA 622 and PCIe switch 632. In addition, there is a set of high-bandwidth bidirectional point-to-point links between adjacent FPGAs. Here FPGA 622 is coupled to FPGA 626 via link 624; FPGA 626 is coupled to FPGA 636 via link 630; FPGA 636 is coupled to FPGA 644 via link 642; and FPGA 644 is coupled to FPGA 622 via link 640. Intra-cluster inter-FPGA communication may proceed over the PCIe switch or directly via the point-to-point links. The links 625, 628, 634, 638 form a ring so that non-adjacent FPGAs, e.g., FPGA's 626 and 644 may communicate with each other by forwarding messages via intermediate FPGAs (here FPGA 626 may send a communication via link 630 to FPGA 636, which may forward a communication via link 642 to destination FPGA 644.

Figure 7:
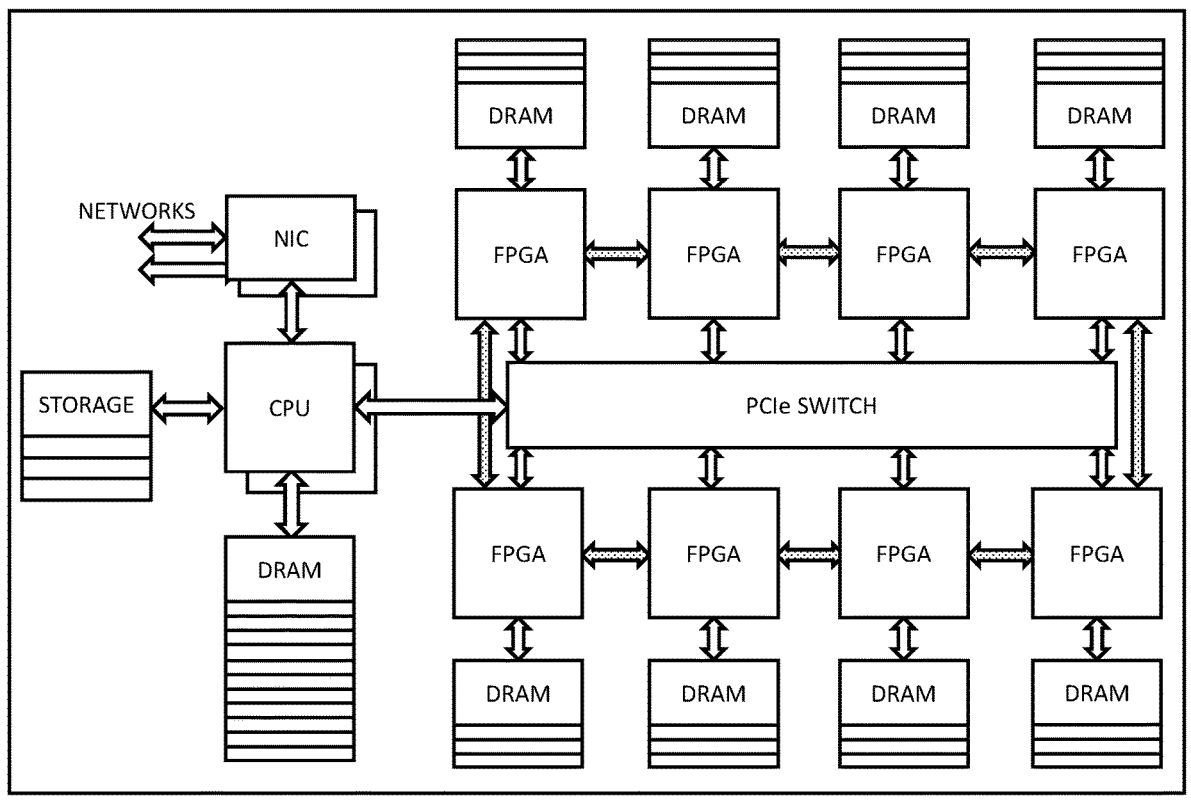

FIG. 7 is a diagram of an embodiment of an even larger FPGA cluster configuration. Compared to FIG. 6B, the FPGA cluster configuration of FIG. 7 has eight FPGAs instead of four, and correspondingly more ports on its PCIe switch, more links between FPGAs, and more PCIe links to the PCIe switch. FIG. 7 serves to illustrate a large cluster system and the need for an inter-FPGA core interconnection system capable of scaling cleanly and uniformly from FIG. 6A to FIG. 5, to FIG. 6B, or to FIG. 7, without changing the message destination addressing scheme or the client cores' NOC interface.

Figure 8:
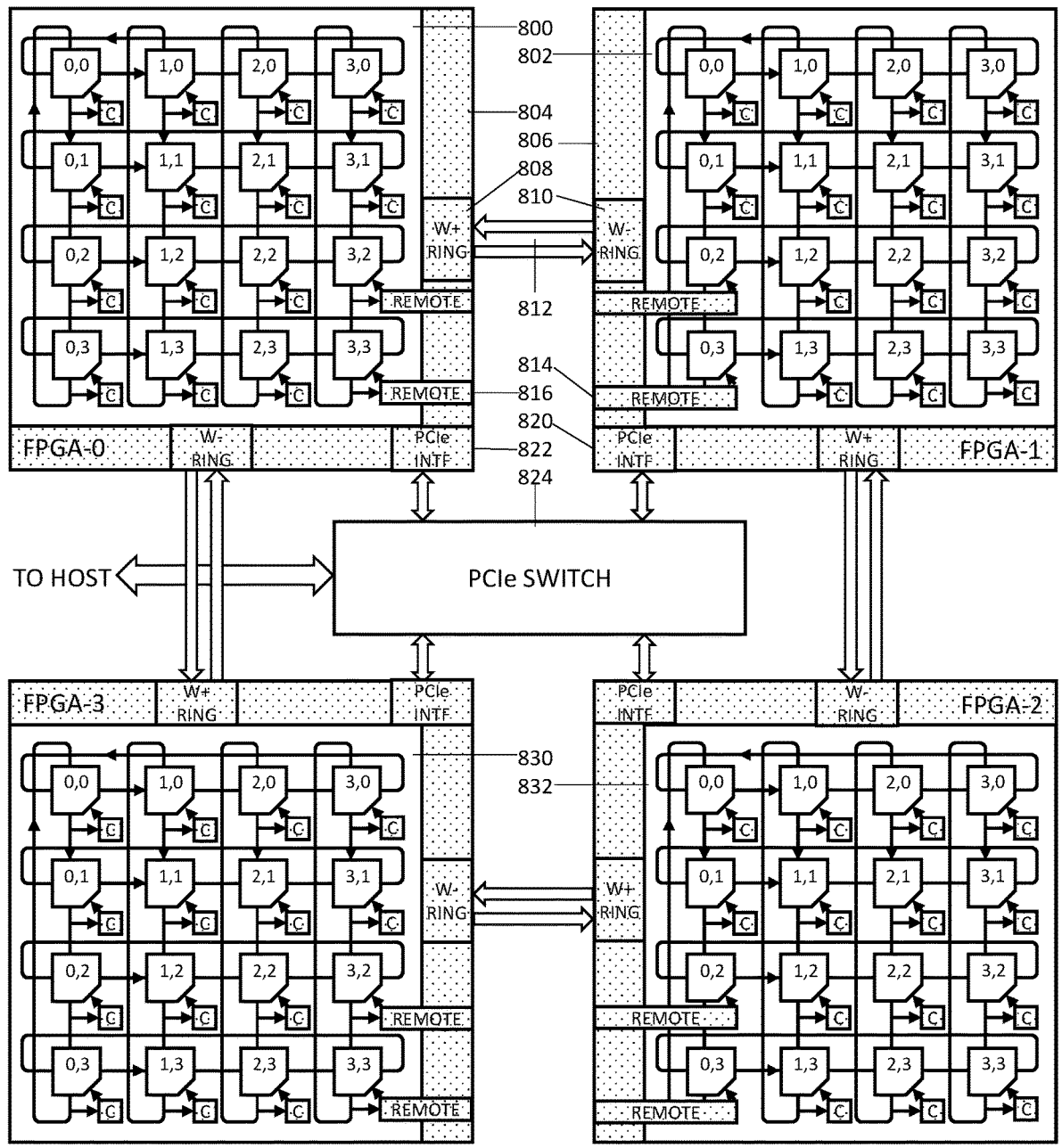

FIG. 8 is a diagram of an embodiment with FPGAs 800, 802, 830, 832, and PCIe switch 824, corresponding to the four FPGAs 622, 626, 636, 644, and PCIe switch 632 of FIG. 6B, but providing greater detail into internal operations. FPGA 800 has shell logic 800 including FPGA ring interface W+ 808 and PCIe interface 822. Similarly FPGA 802 has shell logic 806 including FPGA ring interface W− 810 and PCIe interface 820. FPGA 800 W+ ring interface 808 is communicatively coupled to FPGA 802 W− ring interface 810 via bidirectional ring signals 812. FPGA 800 further includes remote router 816 including one or more NOC interconnections, and FPGA 802 has remote router 814 including one or more NOC interconnections. Two additional FPGAs 830 and 832 complete the quartet.

Figure 9:
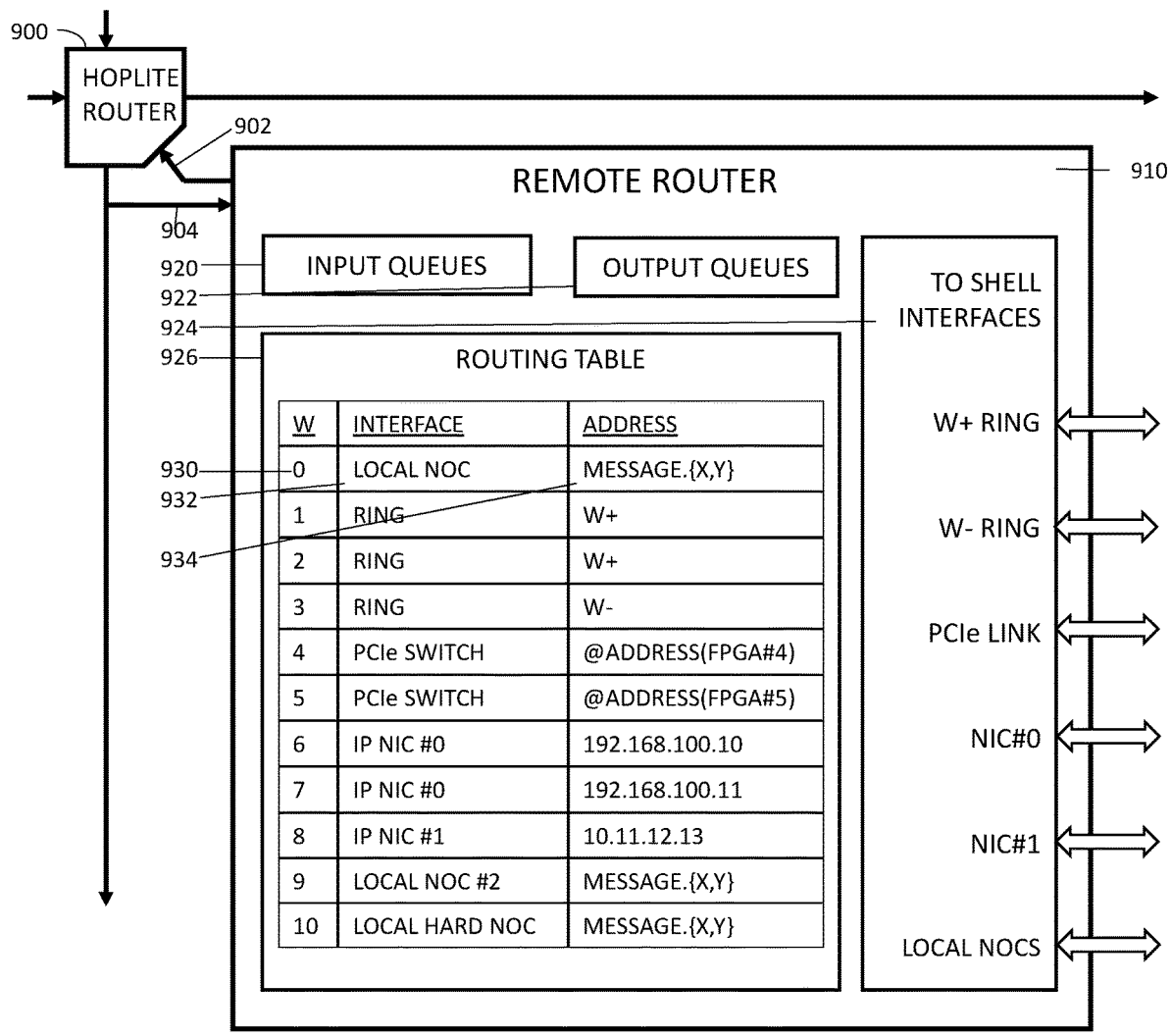

FIG. 9 is a block diagram of an embodiment of a remote router core 910 and its interface to its NOC router 900. The NOC 910 router interfaces to a Hoplite router of the FPGA's NOC, and is capable of sending or receiving messages on the NOC. A remote router includes message input queues 920 and output queues 922, various interfaces to shell external I/O controllers 924, including point-to-point link interfaces, PCIe interfaces, and IP network interfaces. A remote router further includes a routing table 926, which defines, and which allows the router 910 to determine, where and how to route incoming and outgoing messages. An entry in the routing table 926 for a given W defines upon which interface the router 910 is to forward the message and an interface-specific address upon which the message is to be forwarded. In this example, the table has entries that are configured to direct messages to the NOC of this FPGA, to adjacent FPGAs on various ring links (W+, W−), through the PCIe switch, or for transmission as an IP packet, through one or more NICs, to various IP address endpoints. Upon receipt of an incoming message, a remote router consults its routing table to determine where to forward the message. In some cases, an incoming message is forwarded on to another remote router in another FPGA without forwarding the message into the other FPGA's NOC and without delivery to some client core on the other FPGA's NOC.

Figure 10:
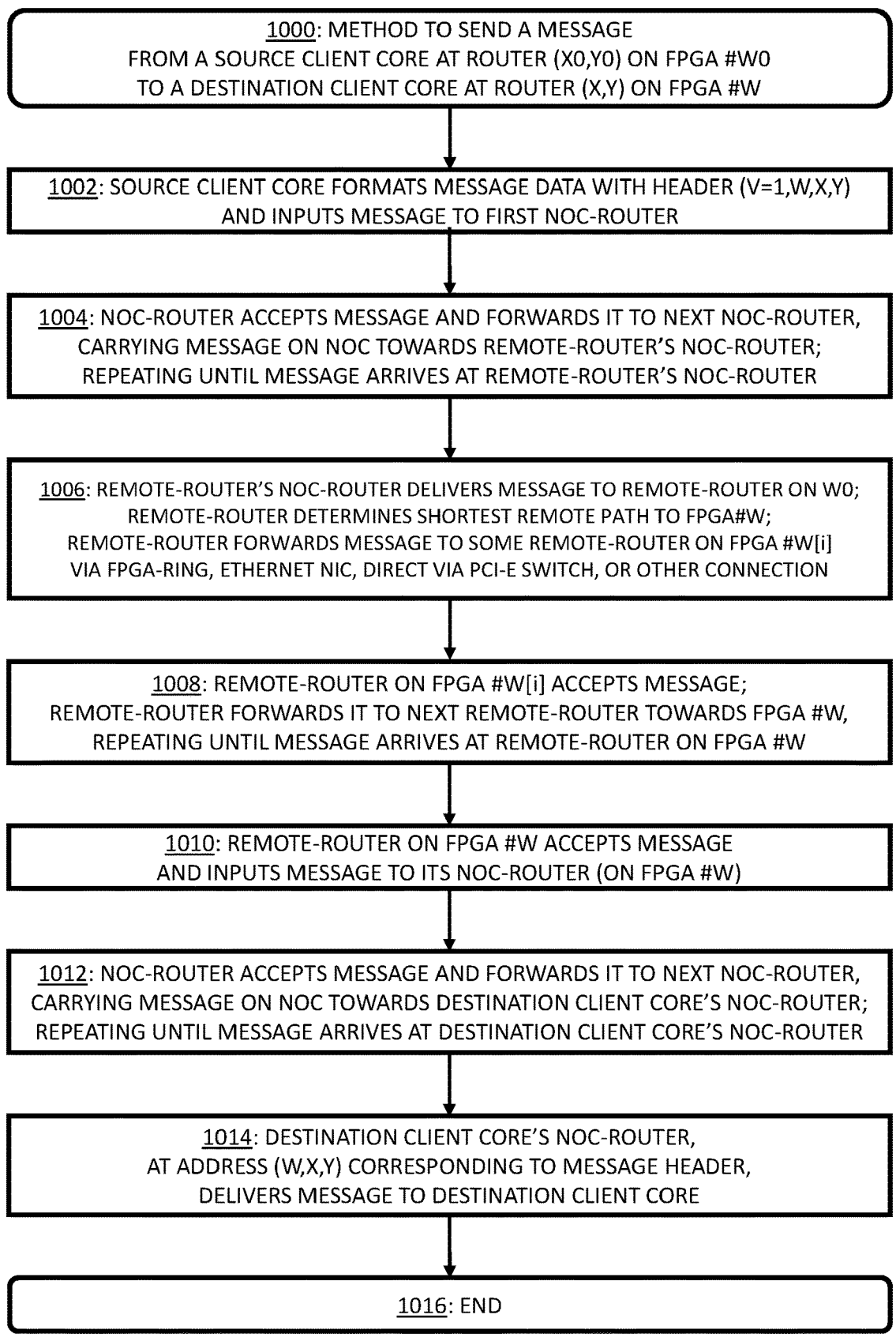

FIG. 10 is a flowchart diagram detailing an embodiment of a method to send a message from a source client core connected to some NOC router on one FPGA, to a destination client core connected to some NOC router on some destination FPGA.

Figure 11:
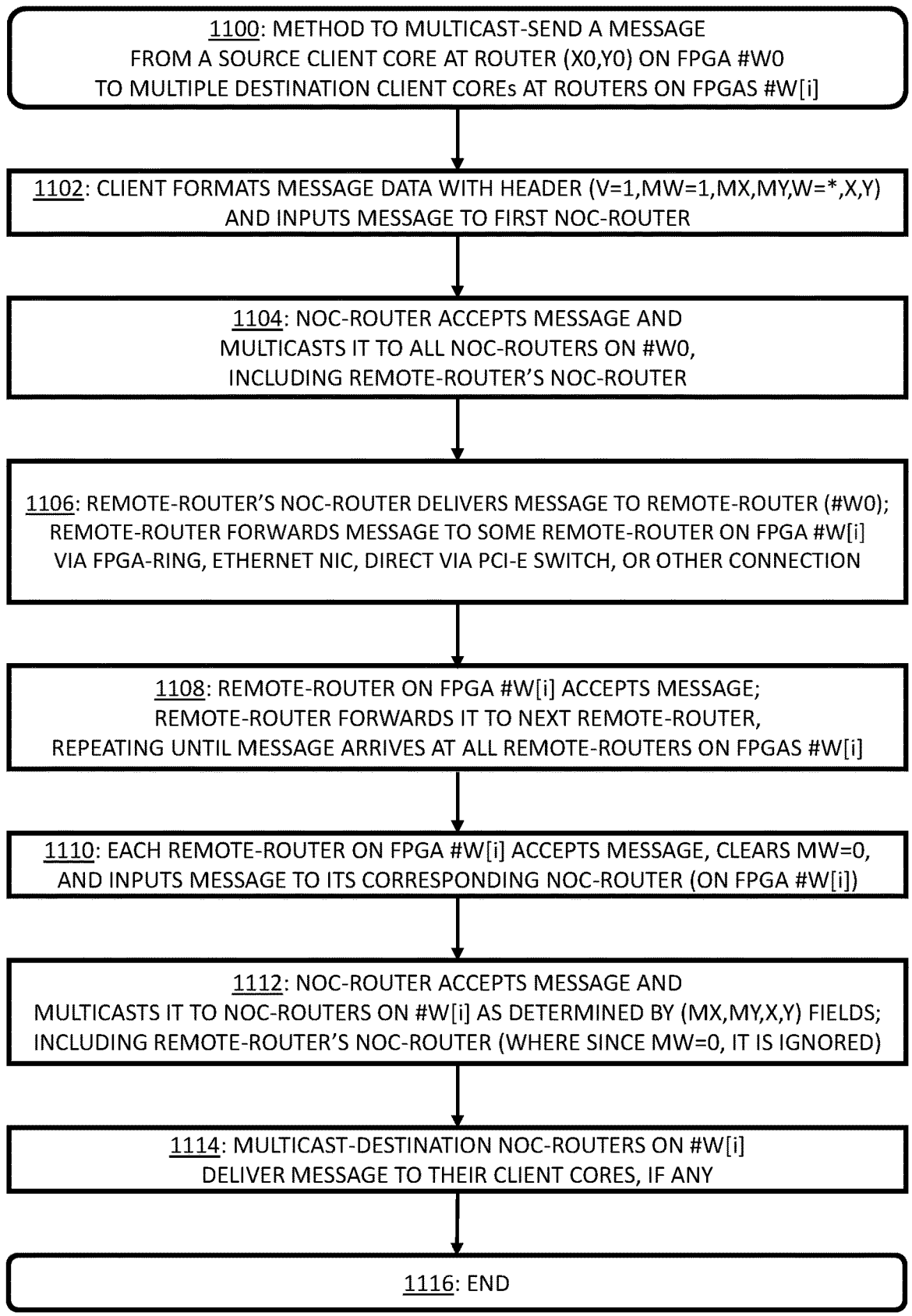

FIG. 11 is a flowchart diagram detailing an embodiment of a method to multi-cast send a message from a source client core connected to some NOC router on one FPGA, to a one or more client cores connected to some NOC router on some destination FPGA, or to one or more client cores connected to NOC routers on one or more destination FPGAs.

Figure 12:
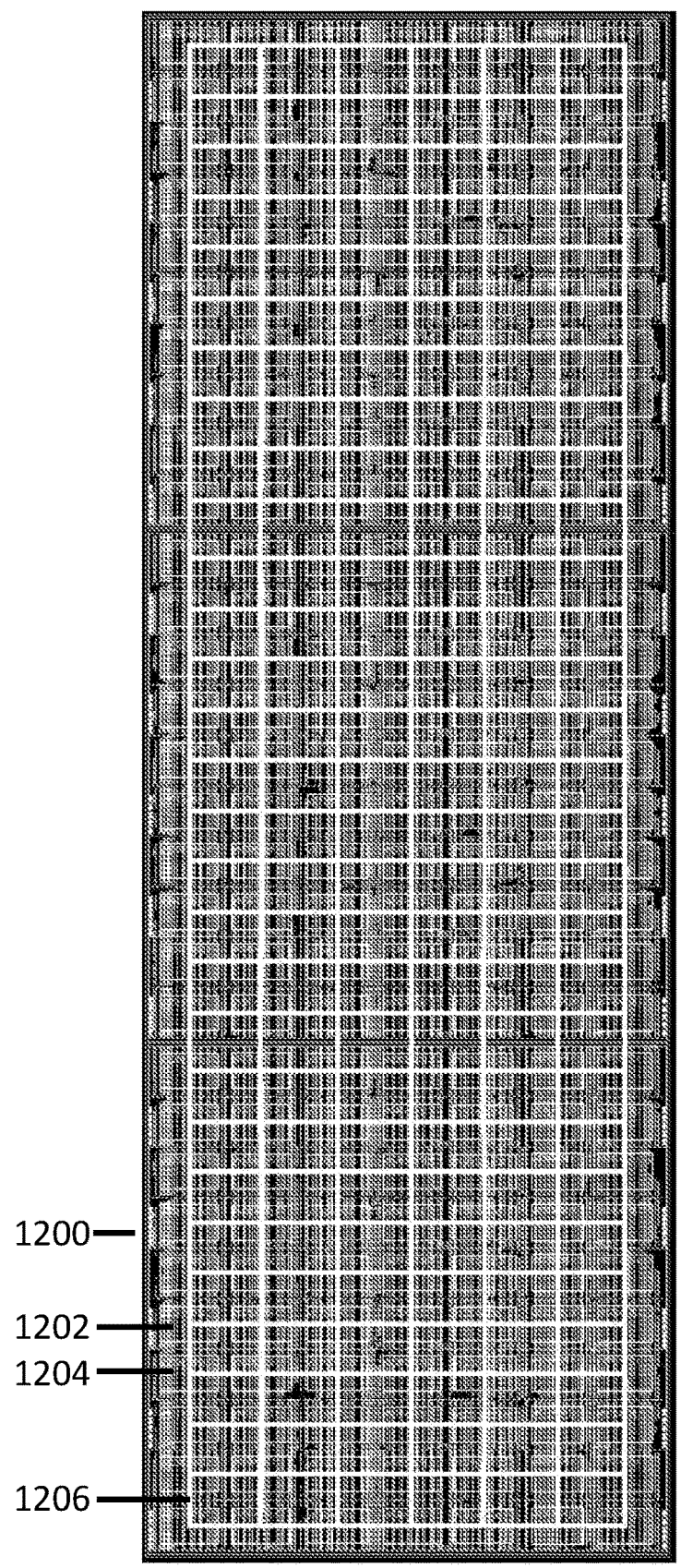

FIG. 12 is a die plot of an embodiment of a massively parallel GRVI Phalanx multiprocessor utilizing a directional torus NOC implemented on a Xilinx XCVU9P FPGA. In this example, the multiprocessor has a 30 rows×7 columns Hoplite NOC, 300b wide. One eight core GRVI cluster, as depicted in FIG. 4, is the client of each NOC router. In all, this chip contains 210 instantiations of FIG. 4, for a total of 1,680 GRVI RISC-V 32b pipelined RISC cores, and 210 cluster RAMs (CRAMs) of 128 KB each, for a total of 26 MB of SRAM. This represents the first chip with over one thousand RISC-V cores, the first FPGA design with over 1,000 RISC cores, and the most 32-bit RISC cores ever implemented on one chip in any implementation technology. This enormous system and NOC, which has been reduced to practice, helps to motivate an additional disclosed improvement called "segmented directional torus" NOCs and NOC routers, described below.

Figure 13A:
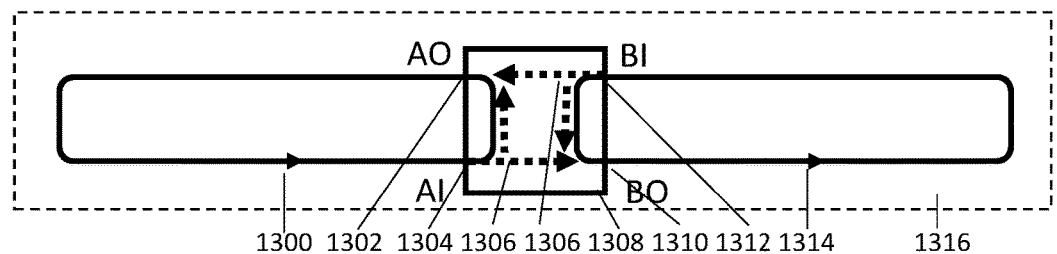

FIG. 13A is a diagram illustrating that introduction of a shortcut router 1308 can subdivide a ring 1316 into two subrings 1300 and 1314, according to an embodiment. The shortcut router 1308 comprises inputs AI 1304 and BI 1312 and outputs AO 1302 and BO 1310. The shortcut router 1308 further includes output multiplexers so that inter-segment message traffic 1306 and 1308 may be routed across segments, or within segments, as specified by a message destination address.

As these FPGA-efficient parallel computer overlays get large and larger, the high diameter NOC rings (here, NY=30 nodes) can incur high message delivery latencies, particularly when two nodes are near each other on the NOC. In prior implementations this could incur a message delivery path visiting up to 30 nodes and taking up to 30 cycles. By segmenting X- and Y-rings of the NOC, local message delivery patterns can remain in their segment, shortening the ring round-trip.

Figure 13B:
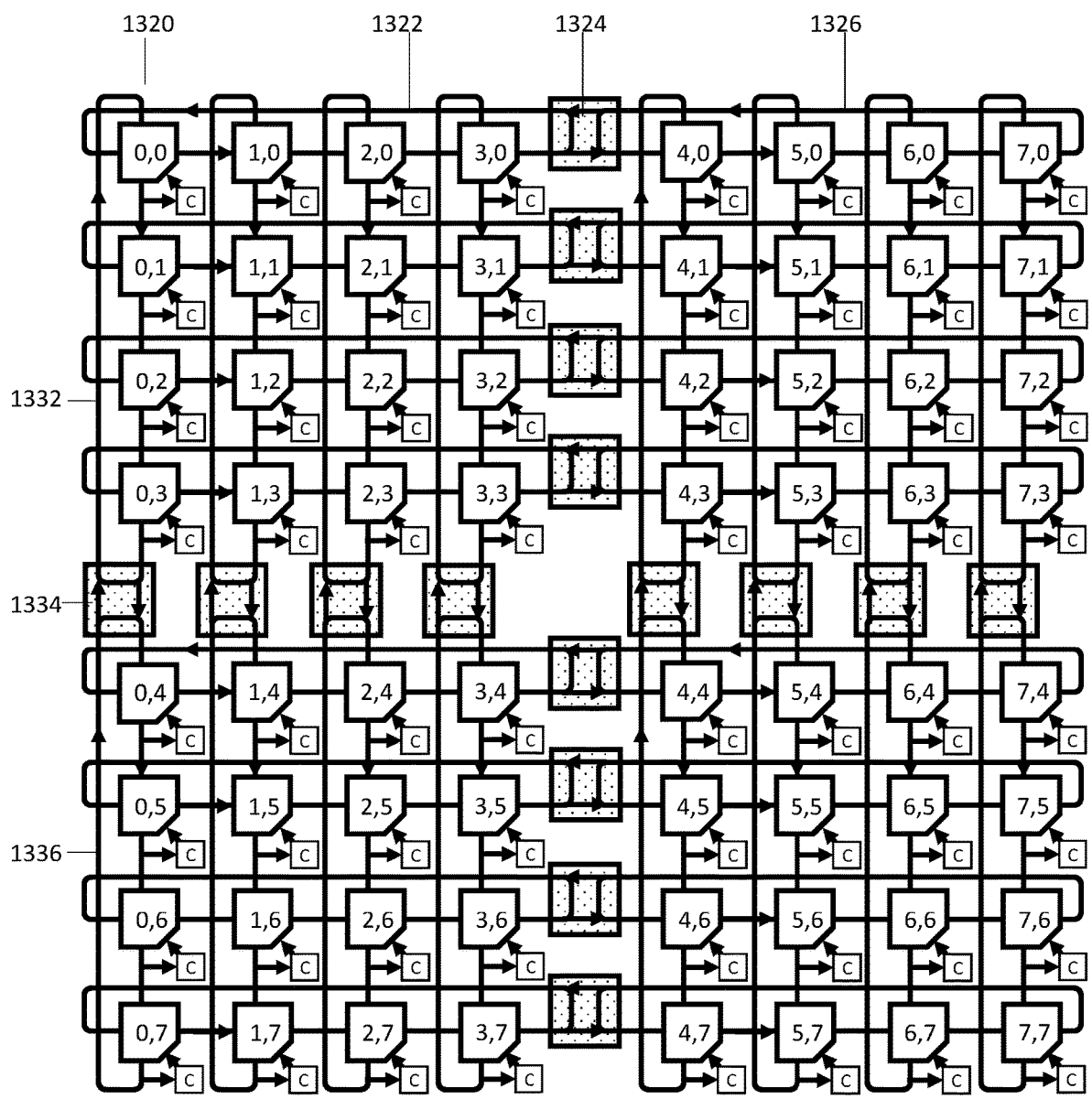

FIG. 13B is a diagram illustrating the subdivision of a system including an 8×8 Hoplite NOC 1320 into four smaller 4×4 Hoplite NOCs bridged by one row and one column of shortcut routers, according to an embodiment. For example when the shortcut router 1324 is introduced into the X-ring [Y=0] the ring is subdivided into two ring segments 1322 and 1326. Similarly when a shortcut router 1334 is introduced into the Y-ring [X=0] the ring is subdivided into two ring segments 1332 and 1336.

Figure 14A:
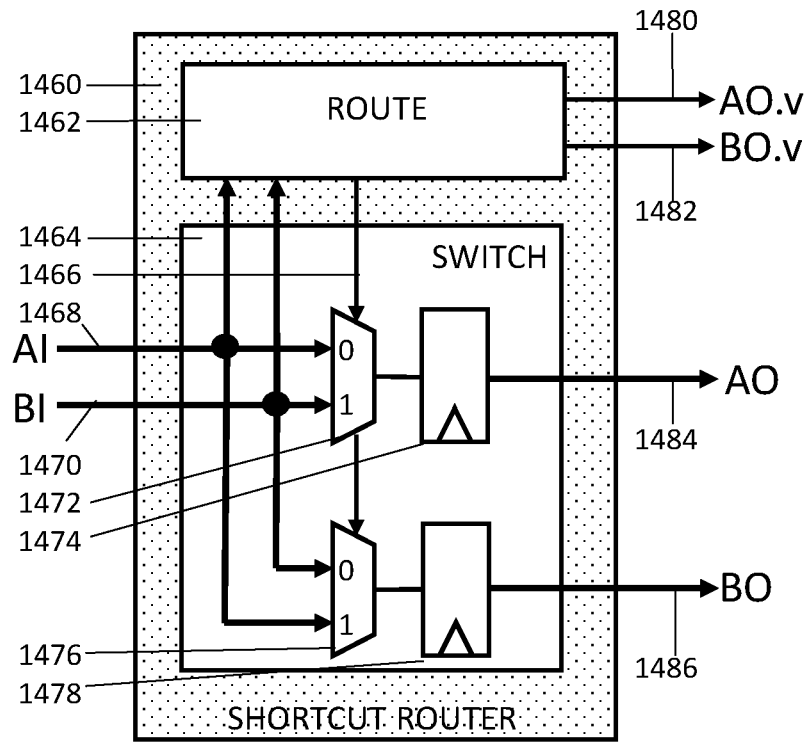

FIG. 14A is a diagram of a shortcut router circuit that can be beneficially used in very large (high diameter) directional torus rings to segment (partition) the rings into ring segments which lower diameter, as disclosed herein. This shortcut router 1460 includes a routing function circuit 1462 and routing switch 1464. Shortcut router 1460 has two message inputs AI 1468 and BI 1470 and two message outputs AO 1484 and BO 1486, and also has two message valid output indicators AO.v 1480 and BO.v 1482. Shortcut router 1460 is configured to forward AI 1468 to AO 1484 and to forward BI 1470 to BO 1486, unless at least one of AI 1468 is valid and destined for the B ring segment coupled to BO 1486, or BI 1470 is valid and is destined for the A ring segment coupled to AO 1484. In that case, shortcut router 1460 is configured to forward AI 1468 to BO 1486 and to forward BI 1470 to AO 1484.

Figure 14B:
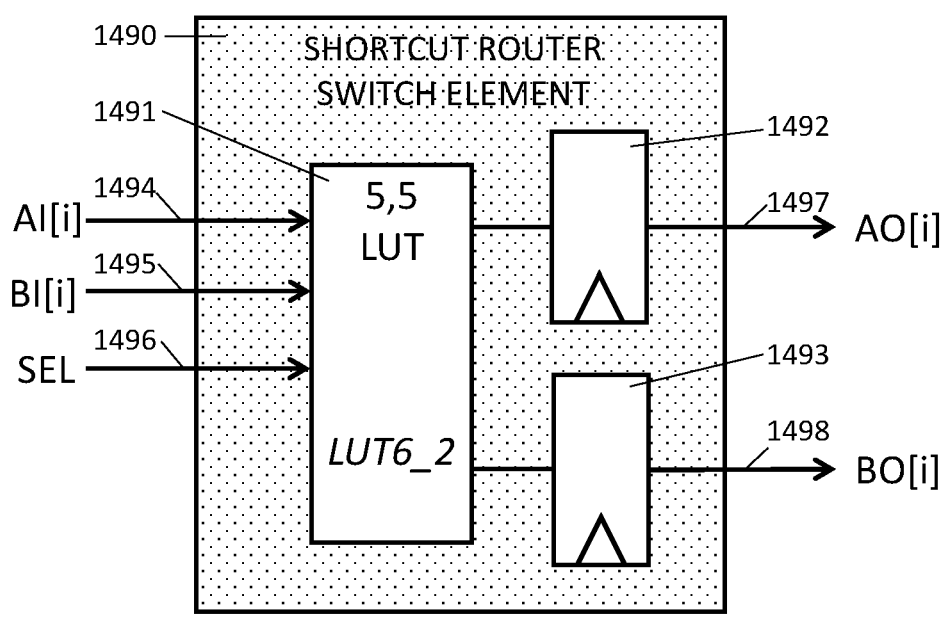

FIG. 14B is a diagram of an FPGA implementation of one switch element 1490 corresponding to one bit of the n-bit shortcut router switch 1464.

Figure 15:
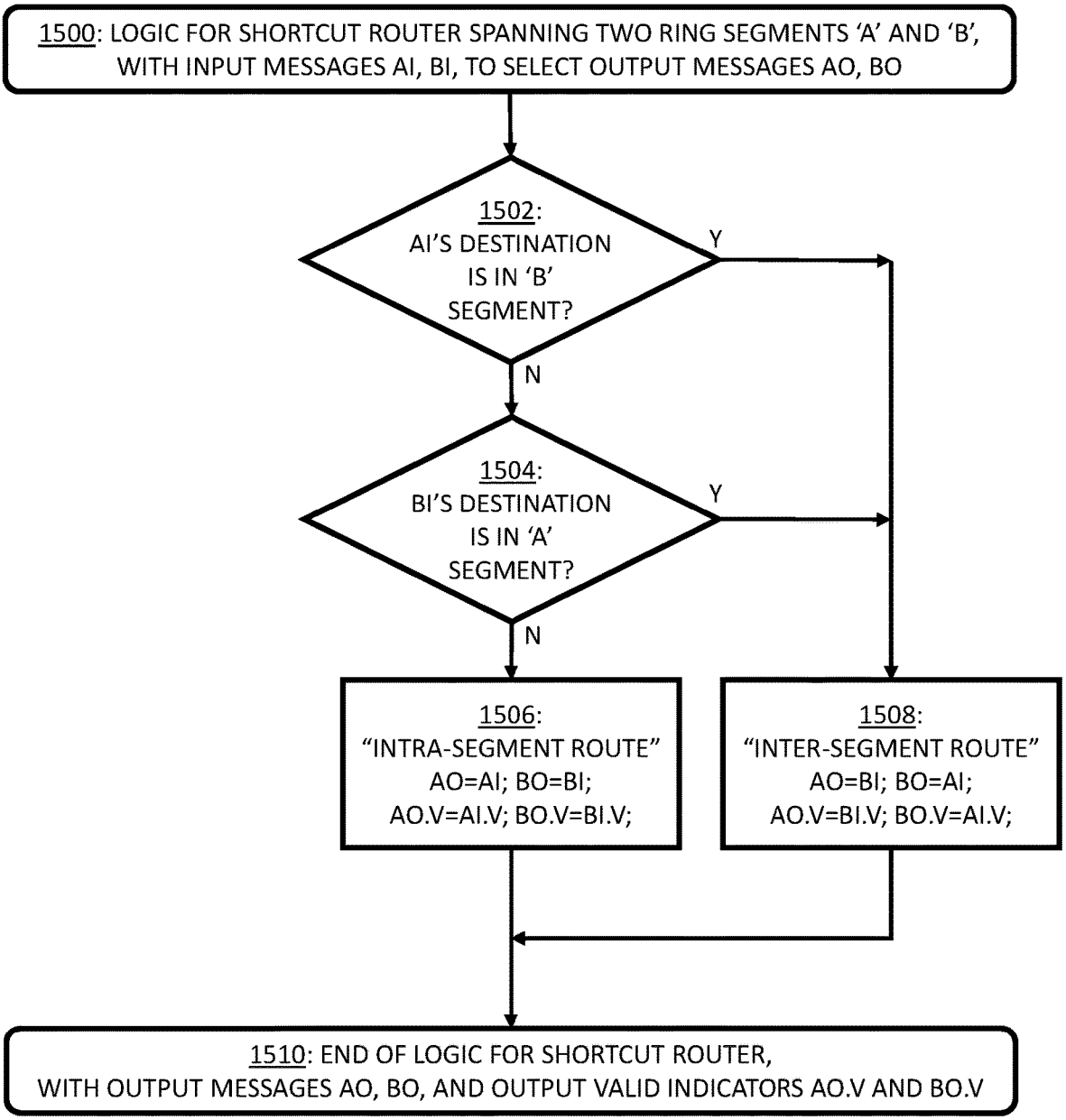

FIG. 15 is a flowchart diagram illustrating the logical functions implemented in the shortcut router 1460, including its routing function circuit 1462, according to an embodiment. This logic is configured to determine whether, on a given clock cycle, to forward the A segment input message AI to the A segment output AO and to forward the B segment input message BI to the B segment output BO, or whether to forward AI to the B segment output BO and forward BI to the A segment output AO, on the basis of whether either of the message inputs AI or BI are valid and destined for the message segments B or A, respectively.

Figure 16:
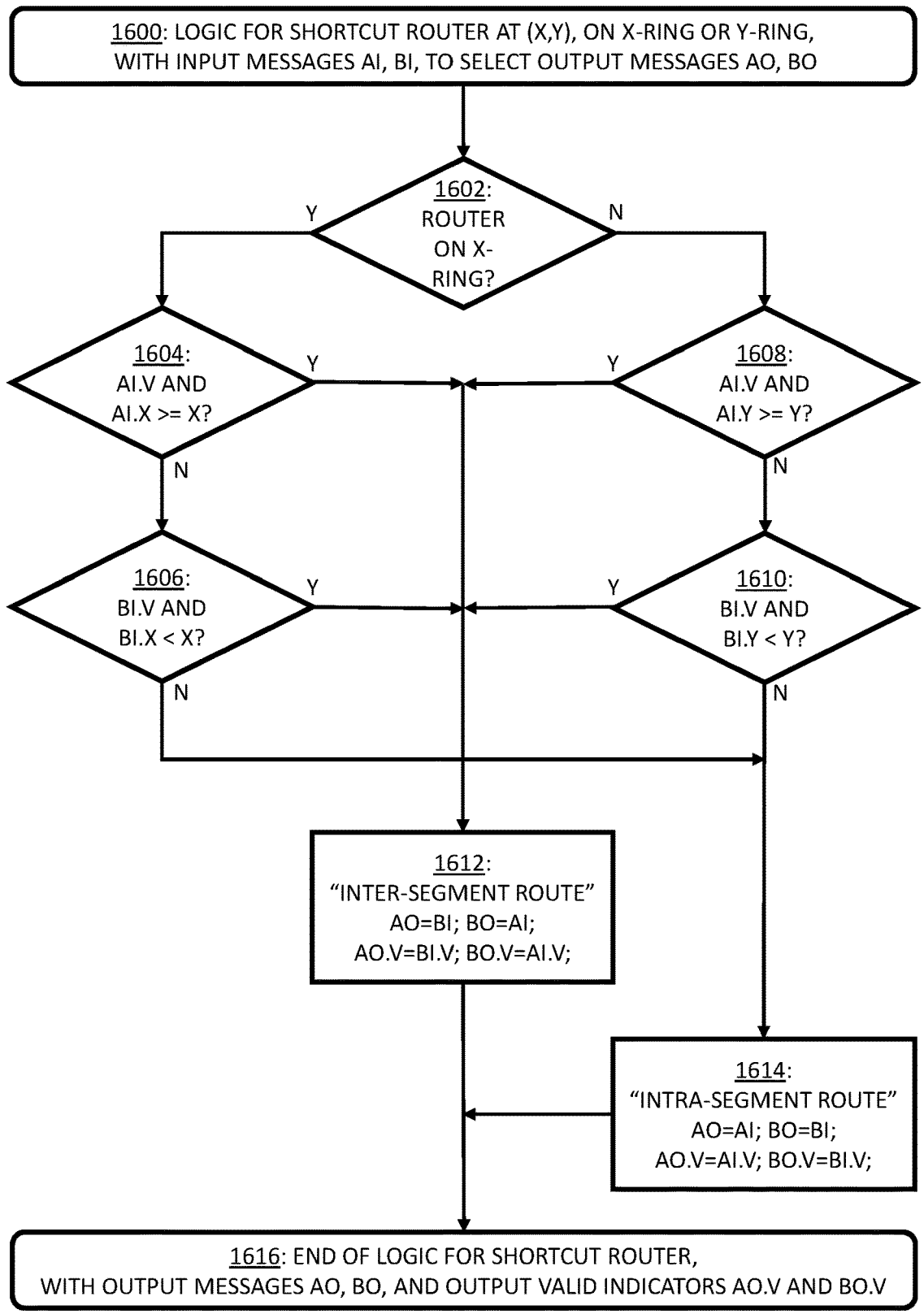

FIG. 16 is a flowchart diagram illustrating, in an embodiment, the logical functions implemented in the shortcut router 1460, including its routing function circuit 1462, for a shortcut router placed in an X ring or Y ring site (X,Y) in a NOC, according to an embodiment. The flowchart illustrates the logic determination of whether, on a given clock cycle, to forward the A segment input message AI to the A segment output AO and to forward the B segment input message BI to the B segment output BO, or whether to forward AI to the B segment output BO and to forward BI to the A segment output AO, in response to the input message valid indicators and destination coordinates of the input messages AI and BI.

Figure 17:
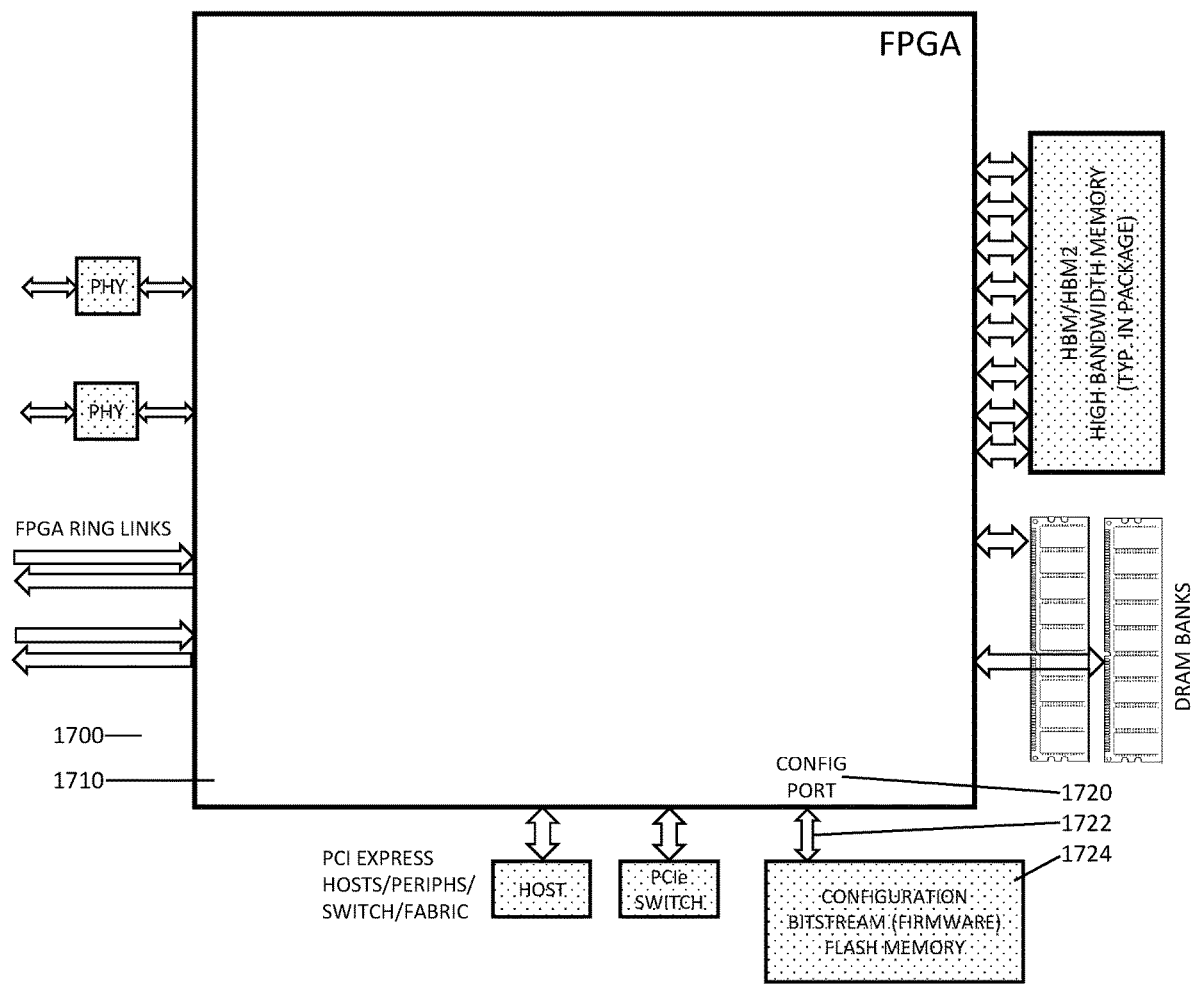

FIG. 17 illustrates how a disclosed NOC router, NOC, remote router, shortcut router, and application system design, after processing by FPGA implementation tools, is manifest in an FPGA configuration bitstream file; how that file is stored in a configuration FLASH memory or similar computer readable medium; how that configuration bitstream is conveyed to the FPGA, via its configuration port, and then to its configuration system, in order to load the bitstream file internally to configure the FPGA device's myriad programmable logic elements and interconnect fabric in order to implement the disclosed router, NOC, and application system.

DETAILED DESCRIPTION

Message Passing Between Arbitrary Client Cores Sited on Separate Devices

Figure 1:
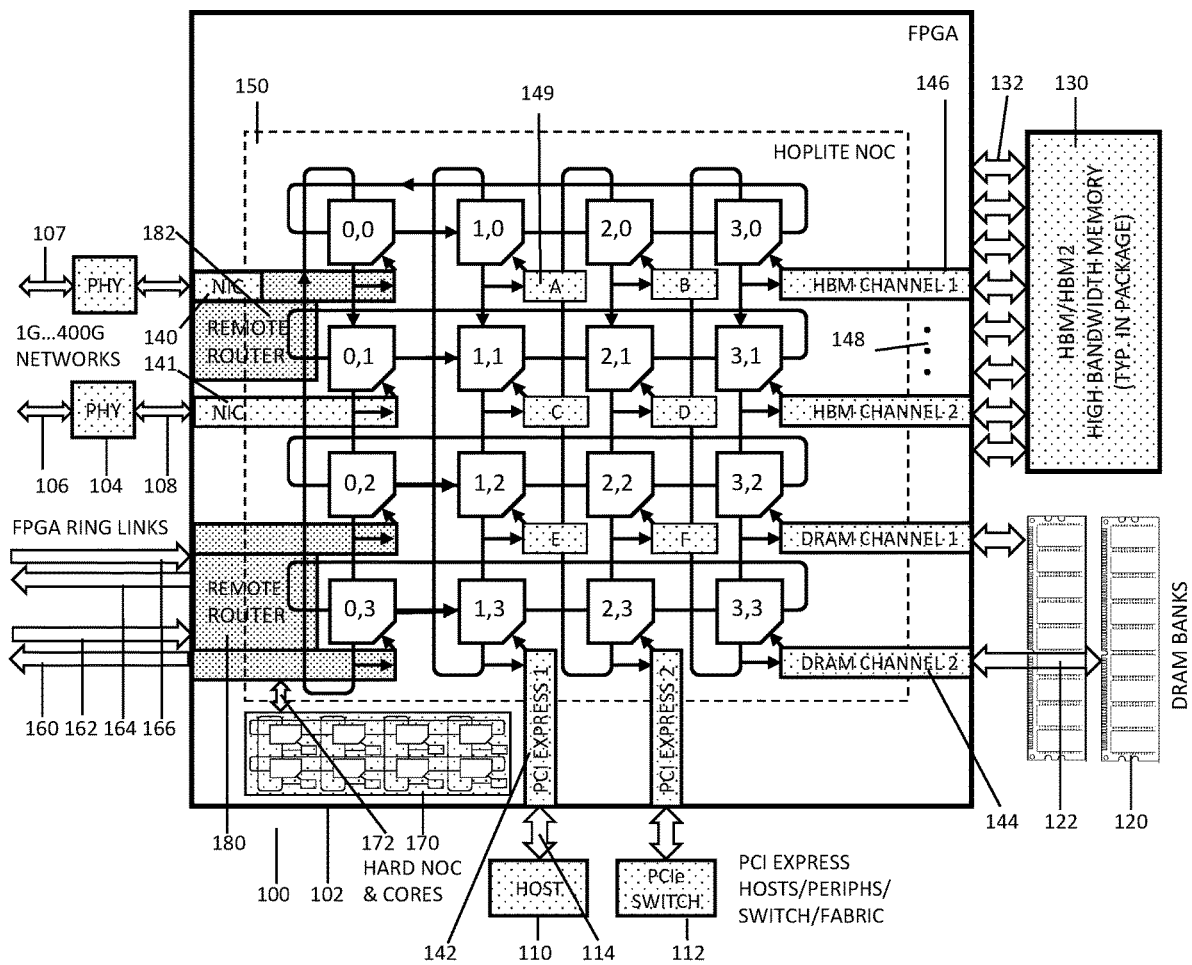
FIG. 1 is a diagram of an embodiment of an integrated computing device 100 that can participate in the disclosed multi-FPGA system architecture, which includes an SOC implemented in an FPGA 102, network interfaces 106 and 107, PCI-express interfaces 114, coupled PCI-express (PCIe) host and switch fabric 110 and 112, DRAM 120, High Bandwidth DRAM (HBM) 130, and a hard (fixed logic) NOC and cores 170. The FPGA SOC 102 includes a plurality of client cores including interface cores 140, 141, 142, 144, 146, and user cores 149 (A-F). The FPGA SOC 102 further includes Hoplite NOC 150. NOC 150 interconnects the diverse client cores in a 4×4 2D directional torus. The FPGA SOC 102 further includes a remote router 180, coupled to the NOC 150 at multiple routers (0,2) and (0,3), and to direct inter-FPGA ring links 160-166, and also coupled to hard NOC and cores 170 by a 'programmable logic to hard logic' interconnect bridge 172. The FPGA SOC 102 further includes a remote router 182, coupled to the NOC 150 at router (0,0), and to NIC 140.

FIG. 1 is a diagram of an embodiment of an integrated computing device 100, which is configured to participate in the disclosed multi-FPGA system architecture, and which includes an SOC implemented in an FPGA 102, network interfaces 106, PCI-express interfaces 114, coupled PCI-express (PCIe) host and PCIe switch 110 and 112, DRAM 120, and High Bandwidth DRAM (HBM) 130. With a single SOC 102, diverse composition, communication, and message passing scenarios amongst client cores (both compute and I/O client cores) are possible as is described in cited applications U.S. patent application Ser. No. 14/986,532 and PCT/US2016/033618, which are incorporated by reference.

A focus of the present disclosure is composition of cores across multiple FPGAs.

FIGS. 5, 6B, and 7 illustrate representative multi-FPGA clusters and networks roughly comparable to the Amazon AWS EC2 F1 instance type and the Microsoft Catapult SmartNIC network, respectively.

In FIG. 5, one of the two FPGAs 504 and 524 can exchange data with the other FPGA, in the form of IP packets, by sending the IP packets to the router/switch fabric 536, addressed to the recipient FPGA. The network is configured to carry those bits. What is lacking in conventional systems, however, is a way to flexibly route and forward data from any one of a plurality of cores, somewhere in the first FPGA 504, to any one of a plurality of cores, somewhere in the second FPGA 524, and vice-versa.

In FIG. 6B, similarly, FPGAs 622 and 626 can exchange data by passing it over point-to-point link 624 or via PCIe transactions via the PCIe switch 632. Here too what is lacking in conventional systems is a way to flexibly route and forward the data from any of a plurality of cores, implemented somewhere in the first FPGA 622, to one of a plurality of cores, implemented somewhere in the second FPGA 626, and vice-versa.

To enable arbitrary core composition efficiently and at this scale relies on the composition of three features: 1) inter- FPGA data transportation, e.g., via point-to-point links, PCIe, IP networking, or other communications networks; 2) intra-FPGA message forwarding and delivery by means of an FPGA-efficient NOC; and 3) a bridge between inter- and intra-FPGA message delivery, described herein as a remote router core.

Therefore, referring again to FIG. 1, the FPGA 102 disclosed herein incorporates a number of external interfaces 106, 107, 110, 112, 114, and FPGA ring links 160-166, by means of interface cores 140, 141, 142, which together may be used to communicatively forward a message from one FPGA to another. The FPGA SOC 102 further includes a remote router 180, coupled to the NOC 150 at multiple routers (0,2) and (0,3), and to direct inter-FPGA ring links 160-166, and also coupled to hard NOC and cores 170 by a 'programmable logic to hard logic' interconnect bridge 172. The FPGA SOC 102 further includes a remote router 182, coupled to the NOC 150 at router (0,0), and to NIC 140.

In an embodiment, an FPGA may have one remote router coupled to a NOC at one NOC router. In an embodiment an FPGA may have one remote router coupled to a NOC at multiple NOC router sites. This potentially increases bandwidth and reduces latency of sending and receiving remote messages. In an embodiment, an FPGA may have multiple remote routers.

When a client core, such as the remote router 180, within the FPGA 102 sends a message to another core within the same FPGA, the message is forwarded by one or more NOC routers as described in the above-cited patent applications. The message format 270 (FIG. 2A) includes the message valid indicator (field v) and also includes a message destination address. In an embodiment, the destination address includes the (x,y) address of the router to receive the message.

In another embodiment, the destination address may be specified by other means, such as a destination router index, or via "source routing," which indicates the relative path to take to the destination router, e.g., "go 'east' on the X ring for three router hops, then turn and go 'south' on that router's Y ring for two more hops." Other destination router specifiers (herein called destination address) are known and, therefore, are not described herein.

To extend the domain of NOC message passing to span multiple FPGAs, it can be advantageous to use a uniform message format with a uniform destination address specifier. Then a client core can send messages to another client core, anywhere, without the complication of determining and preparing message headers that are formatted differently when the destination is local (this FPGA) or remote.

In an embodiment, a remote destination may be within another FPGA or integrated circuit. In an embodiment, a remote destination may be within a second soft NOC within the same device. In an embodiment, a remote destination may be within a hard NOC and cores partition 170 (FIG. 1) within the same device. In an embodiment, a remote destination may be the network port of a computer system.

Accordingly, FIG. 2A presents several data exemplary message formats that elaborate on this significant design point. In an embodiment, the (x,y) coordinates of message format 270 uniquely identify a specific router on an arbitrary FPGA. For example, the routers in FPGA #0 may be (0,0), . . . (7,7), and the routers in FPGA #1 may be (8,0), . . . (15,7).

In an embodiment, global message format 272 includes a message valid indicator (field v), the destination device index (field w), and fields (x,y) that designate a destination NOC router on the destination device (which may be the present device (of the client which sends the message)).

In an embodiment, the sending router's device is an FPGA. In an embodiment, the destination router's device is an FPGA. In an embodiment, the sending router's device is an ASIC. In an embodiment, the destination router's device is an ASIC. In an embodiment, the source router lies within a soft NOC implemented in an FPGA fabric. In an embodiment, the source router lies within a hard (hard-wired) NOC implemented in an FPGA device. In an embodiment, the destination router lies within a soft (bitstream configurable) NOC implemented in an FPGA fabric. In an embodiment, the destination router lies within a hard NOC implemented in an FPGA device.

In an embodiment, a hybrid FPGA includes both a programmable logic fabric and a hard NOC. In an embodiment, the sending router is a soft NOC router implemented in the programmable logic fabric and the destination router is a hard (fixed logic) router on the hard NOC. In an embodiment, the sending router is a hard router on the hard NOC and the destination router is a soft NOC router implemented in the programmable logic fabric.

To facilitate a variety of multicast message send patterns, in an embodiment, a message field 'mw' is used to specify message broadcast across a set of FPGAs.

In an embodiment, the destination FPGA may be specified by other means, such as a globally unique FPGA ID number field. In an embodiment, the destination FPGA may be specified by an IP address field. In an embodiment, the destination FPGA may be specified by a "source routing" field, which indicates the relative path to take to the destination FPGA from the source FPGA using inter-FPGA interconnections links. In an embodiment, the destination FPGA may be specified by a PCIe address range. Other means of specifying a destination FPGA are known and, therefore, are not described herein.

In an embodiment, the fields of global message format 274 specify the local (x,y) address of a client core, which may be a remote router, to forward the message to, and onwards to the remote FPGA, and additional (w,x',y') address fields, interpreted by a remote router, indicate the remote FPGA and remote NOC address (x',y') where the message should be forwarded.

Thus, in an embodiment, to send a message to the client core of destination router (2,3) on FPGA #1, from a client of source router (4,4) on FPGA #0, the source router's client submits a message to its NOC router with a message header 272 of {v:1, . . . , w:1, x:2, y:3, . . . }. As described below, to deliver this message relies on the cooperation of the source client core and its NOC router on FPGA #0, a remote router on FPGA #0, zero or more intermediary remote routers on other FPGAs, possibly external routing (for example, IP network routing of packets between FPGA #0 and #1), a remote router on FPGA #1, and a NOC of FPGA #1.

In an embodiment, the inter-FPGA message forwarding system and intra-FPGA NOC message forwarding system include message header and destination address information in each message. In another embodiment, the message header may be elided from some messages. In another embodiment, a message takes several cycles to deliver, and its header and addressing information is only provided in one of these cycles.

Referring to FIG. 9, a remote router core 910 bridges the intra-FPGA NOC and the external world. The remote router core 910 is coupled to the NOC by means of send 902 and receive 904 interfaces on a NOC router 900. The remote router core 910 is coupled to the outside world via "shell" interfaces (which may be provided by an FPGA vendor or cloud vendor, or may be implemented directly), which may include point-to-point ring links, PCIe links and switches, and IP network links. A remote router core, such as the core 910 is configured to keep (or to consult) routing table 926, which determines how the remote router forwards messages that it receives from the NOC or from external interfaces. When a message arrives at a remote router, it may be queued temporarily in input queues 920. The remote router examines the message destination address in the header and determines where to forward (i.e., to send), the message. In an embodiment the remote router examines the 'w' (FPGA #) indicator in the message destination address and looks up 'w' in its routing table 926, column 930. A matching entry will indicate (column 932 and 934) which interface to forward the message to, and what destination address to use in that case. If the destination interface is the on-chip (local) NOC, the message is forwarded from the input queues 920 into the NOC via its router interface 902 and is destined for the local (x,y) NOC address in the message destination address. If the destination interface is external, the message may be forwarded from the input queues 920 to the external interface, raw, or encapsulated, and sent on the designated address. If the destination is an external point-to-point link, the address may specify which such link to traverse. If the destination is to a memory mapped aperture on some other device, the address may be a memory address. If the destination lies across an IP address, then the remote router address may specify an IP address and may specify a port number at that IP address. If (i.e., entry #9) the destination is a local client core coupled to a second local soft NOC in the programmable logic fabric, then the address may specify the (x,y) address of the local client core on the second NOC. If (i.e., entry #10) the destination is a local hard core coupled to a local hard NOC in a hard (fixed logic) partition in the same chip, then the address may be the core ID, core index, (x,y) address, or other means to designate the specific hard core. In other embodiments, diverse other interfaces, protocols, or addresses may be used.

In an embodiment, each instance of a remote router routing table 926 may have different entries. For example, the routing table of remote router 816 on FPGA #0 may have an entry that says to route messages with destination address at w=0 (i.e., FPGA #0) to the local NOC (i.e., on FPGA #0), and to route messages with destination address at w=1 (i.e., FPGA #1) to FPGA #1 (802) across the W+ ring interface 808; whereas the routing table of remote router 814 on FPGA #1 may have an entry that says to route messages with destination address at w=0 (i.e., on FPGA #0) across the W– ring interface 810, and to route messages with destination address at w=1 to the local NOC on FPGA #1.

If a matching 'w' entry is not found in the routing table 926, the message may be discarded or it may be forwarded to a default destination address. In some embodiments, a message also includes a source address field, in which case a positive or negative acknowledgement message may be sent back to the sender by the router.

Upon determining the output interface and address to use, the remote router 910 may directly forward the message to that interface/address, or it may first enqueue the message in an output queue, awaiting availability of the output interface.

Depending upon the particular external interface, a variety of flow control mechanisms may be employed, including dropping messages on buffer overflow, direct flow control by deasserting ready signals or asserting negative acknowl-edgements, distributed credit-based flow control, or other embodiments using known techniques.

To appreciate in detail how a message may be forwarded to any one core from any other core, across FPGAs, refer now to FIG. 8, which itself is an elaboration of the FPGA ring in FIG. 6B. In particular consider how a message from client core at the router (0,0) on FPGA-0 800 may be transported to the client core at router (1,1) on FPGA-1 802:

1) The client core at router (0,0) on FPGA-0 800 outputs a message with destination address (w,x,y)=(1,1,1);
2) the NOC router at (0,0) accepts the message, and, implementing a dimension order routing (DOR) algorithm, forwards it to router (1,0);
3) in turn the message is forwarded to router (2,0), router (3,0), router (3,1), router (3,2), and router (3,3);
4) there the router (3,3) outputs the message to the remote router 816;
5) remote router 816 of FPGA-0 800 examines the message's destination address, determines 'w'=1, consults its routing table 926 (FIG. 9), and determines FPGA [w=1] lies across the W+ ring link;
6) remote router 816 queues the message for transmission across this interface (the W+ ring link 808) in the output queues (FIG. 9);
7) when transmission occurs (which may await channel availability, flow control management, etc.) the message is transmitted and subsequently received by the remote router 814 of FPGA-1 802;
8) the remote router 814 inspects its analogous routing table 926 (but with different contents to those depicted in FIG. 9) and determines that for 'w'=1, the message should be forwarded to the local NOC at router (0,3) of FPGA-1 802;
9) the remote router 814 forwards the message to router (0,3); since the local destination NOC address of the message is (1,1), the message is forwarded (using dimension order routing DOR) from the router (0,3) to router (1,3), router (1,0), router (1,1);
10) because the router (1,1) on FPGA-1 802 corresponds to the message destination address, the message is delivered to the client core at NOC router (1,1) on FPGA-1 802.

FIG. 10 is a flow diagram of a method for sending a message from a source client core at some router (x0,y0) on FPGA #W0 to a destination client core at some router (x,y) on FPGA (w), via the steps of:

1) 1002: the source client core formats a message with the global destination address w:(x, y), such as using message format 272;
2) 1004: source client core's NOC router accepts the message and forwards it to the next NOC router, forwarding the message along on the NOC towards FPGA #W0's remote router, repeating until the message arrives at the NOC router coupled to FPGA #W0's remote router;
3) 1006: that router delivers the message to FPGA #W0's remote router;
4) FPGA #W0's remote router client determines, by consulting its routing table, the shortest remote path to FPGA #w;
5) FPGA #W0's remote router client forwards the message, to some remote router on a next FPGA, via the interface specified in the routing table 926; the interface may be point-to-point link, ring, IP network, PCIe, PCIe switch, CAPI link, NVlink, CCIX link, or other suitable means;

6) 1008: the remote router on the next FPGA or device receives the message; it forwards it along to the next remote router towards FPGA #w, repeating until the message arrives at the remote router on FPGA #w;
7) 1010: FPGA #w's remote router accepts the message and forwards it to its NOC router (there on FPGA #w);
8) 1012: this NOC router accepts the message and forwards it to the next NOC router of FPGA #w, carrying the message on the NOC towards the destination client core's NOC router on FPGA #w, repeating this forwarding until the message arrives at the router corresponding to the message destination address;
9) 1014: that router receives the message and forwards it to the destination client core;
10) the destination client core receives the message.

Inter-FPGA Multicast Messages

FPGA systems may support interconnection of client cores into massively parallel systems, wherein some messages are multicast messages, i.e., multiple copies of a message that may be sent to many destination client cores—across one FPGA, or across the cluster, datacenter, or cloud of FPGAs. This contrasts with a system without multicast messages, wherein each copy of a message is sent separately, and wherein sending so many distinct copies of a message may be prohibitive from a performance, energy, or cost perspective.

Disclosed herein is an embodiment of a system and a method for sending and delivering multicast messages (i.e., messages which are each addressed to and delivered to a plurality of client cores) including an FPGA NOC system that can concurrently deliver a mix of point-to-point messages as well as W-, X-, Y-, WX-, WY-, XY-, and WXY-multicast (broadcast) messages, across FPGAs across a cluster, datacenter, or cloud.

Inter-FPGA multicast message delivery builds upon the disclosed Hoplite NOC support for X-, Y- and XY-multicast (broadcast) message delivery across the client cores interconnected by a NOC on one device. By extending the uniform message delivery address fields 272 to include a new 'mw' indicator, along with previously disclosed X- and Y-multicast control indicators 'mx' and 'my', a client may select whether to multicast to a row, a column, or an entire FPGA on one FPGA (the local (i.e., source) FPGA, or a remote FPGA), to a single destination router site across all FPGAs, a row on all FPGAs, a column on all FPGAs, or to all destinations on all FPGAs.

When a message is sent with mw indicator mw=1, it means the remote router and its peer remote routers are to perform the same local multicast or non-multicast message delivery to all FPGAs in the system. A message header with fields {v=1, mw=1, mx=1, my=0, w=*, x=*, y=y1} means multicast the message to all FPGAs and on each FPGA multicast to all clients of routers on the X-ring [Y=y1]. In contrast, the message header {v=1, mx=0, mx1=, my=1, w=2, x=*, y=*} means send an XY-multicast message to FPGA #2 only; and on that FPGA, broadcast the message to all client cores of the NOC.

In an embodiment, selective multicast and broadcast is also possible. In an embodiment, a multicast filter 'tag' field is added to the message (e.g., to global message format 274 (FIG. 2)). In an embodiment, a NOC router includes a set of multicast filter tag values, and upon receiving a multicast message to be delivered to its client core, the NOC router compares the message tag with its multicast filter tag set, delivering (or, not delivering) the message depending upon whether the message tag value is within the multicast filter tag set. In an embodiment, a destination address set is added to the message format. In an embodiment, the destination address set is a bit vector, with one bit for every destination site in a NOC. In an embodiment, the destination address set is a bit vector, with one bit for every destination site in any NOC in any FPGA. In an embodiment, when a NOC router receives a multicast message to be delivered to its client core, the NOC router tests whether its address is a member of the message's destination address set, delivering (or, not delivering) the message accordingly.

In an embodiment, a remote router has a set of multicast filter tag values, and upon receiving a multicast message to be delivered to one or more client cores somewhere on its NOC, the remote router compares the message tag with its multicast filter tag set, delivering (or, not delivering) the message depending upon whether the message tag value is within the multicast filter tag set. In an embodiment, a destination FPGA set is added to the message format. In an embodiment, the destination FPGA set is a bit vector, with one bit for every FPGA in the multi-FPGA system. In an embodiment, when a remote router receives a multicast message to be forwarded to its NOC, the remote router tests whether its FPGA index is a member of the message's destination FPGA set, forwarding (or, not forwarding) the message into its NOC accordingly.

FIG. 11 is a flowchart diagram of a method for performing system-wide inter-FPGA multicast message delivery, from a source client core at router (x0,y0) on FPGA #W0 to multiple destination client cores at routers on multiple FPGAs #W[i].

1) 1102: A client core formats a message with a destination address/header with mx=1 signaling inter-FPGA multicast delivery; the message may also indicates local X-, Y-, or XY-multicast delivery to be performed across the local NOC of each FPGA in the system;
2) 1104: A NOC router accepts the message and (according to the message multicast flags) multicasts it to one or more NOC routers on FPGA #W0; the NOC router also forwards the message to the NOC router coupled to the FPGA's remote router;
3) 1106: This NOC router delivers the message to the remote router of FPGA #W0; the remote router consults its routing table 926 (FIG. 9) and forwards the message to one or to a plurality of remote routers on other FPGAs #W[i], via the interface(s) specified in the routing table 926; the interface may be point-to-point link, ring, IP network, PCIe, PCIe switch, CAPI link, NVlink, CCIX link, or other mean apparent to one skilled in the art; (In an embodiment, if multiple FPGAs lie across one interface, a single multicast message is forwarded. In an embodiment, if multiple FPGAs lie across one interface, multiple copies of a multicast message are forwarded, one copy per FPGA.)
4) 1108: a remote router on FPGA #W[i] accepts the message; the remote router forwards it to the next remote router, if any, repeating until message arrives at all remote routers on FPGA #W[i];
5) 1110: each remote router on FPGA #W[i] accepts the message; clears the global multicast flag (mw=0) and forwards the message to its corresponding NOC router;
6) 1112: the NOC router accepts the message and unicasts or multicasts it to one or more NOC routers on the NOC local of FPGA #W[i], as determined by the message multicast control fields (mx, my, x, y);
7) 1114: the one or more NOC routers on the NOC deliver the message to their client core(s), if any.

Three examples will help to illustrate an embodiment of inter-FPGA multicast messaging.

In one example, the client of router (0,0) in FPGA #0 800 (FIG. 8) sends a multicast message to all clients of the NOC of FPGA #1 802. It sends the message {v=1, mw=0, mx=1, my=1, w=1, x=*, y=*, . . . }. Router (0,0) in FPGA-0 forwards this, hop by hop, arriving at router (3,3) which forwards the message to the remote router 816. Noting the message is not multicast to each FPGA (i.e., mw=0), the remote router of FPGA #0 consults its routing table, which directs the message to be transmitted to the next FPGA (FPGA #1) via the W+ ring links 812. The remote router 814 of FPGA #1 receives the message. Consulting its routing table, it determines the message is destined for FPGA #1 only and forwards the message to its NOC router (i.e., router (0,3)). Since the message is XY-multicast (i.e., mx=1, my=1), FPGA #1's NOC delivers a copy of the message to every client of every NOC router of FPGA #1's NOC. This includes delivery to FPGA #1's remote router core 814 which is coupled to router (0,3); in this case the message is discarded.

In another example, the client of router (0,0) in FPGA #0 800 sends a multicast message to all clients of router (1,1) in all NOCs in all FPGAs #0-3 (800, 802, 830, 832). The message is {v=1, mw=1, mx=0, my=0, w=*, x=1, y=1, . . . }. The message travels over the NOC of FPGA #0 to the remote router 816. The remote router 816 determines (i.e., mw=1) that the message is multicast to all FPGAs. It forwards the message back into the NOC of FPGA #0 for delivery to the client of router (1,1) in FPGA #0. The remote router may also forward the message to the remote router of every other FPGA. In an embodiment, remote router 816 uses PCIe-switch-multicast to transmit a single copy of the message, via the PCIe switch interface 822, and via the PCIe switch, to all the remote routers of the other FPGAs. In an embodiment, it transmits a separate copy of the message to each other FPGA over the PCIe switch. In an embodiment, it transmits a single copy of the message to the remote router of the next FPGA (i.e., FPGA #1) over inter-FPGA ring link 812. In an embodiment, FPGA #1's remote router 814 is responsible for propagating the multicast message delivery to the next FPGA #2 832, and 832 in turn to the remote router of FPGA #3 820. In an embodiment, the remote router of FPGA #3 830, or remote router 816 of FPGA #800 terminate this inter-FPGA message propagation to achieve exactly once delivery of the multicast to the NOC of each FPGA. At the remote router of each FPGA, upon receipt of the multicast message, the message is also forwarded into that FPGA's NOC for delivery (or deliveries) to the specified destination address. In this case, on FPGA #1, FPGA #2, and FPGA #3's NOCs, the message is forwarded through each NOC to its local destination client core on router (1,1) on each FPGA.

In another example, the client at NOC router (0,0) on the NOC of FPGA #0 sends a broadcast message to all clients of all NOCs of all FPGAs. The message is {v=1, mw=1, mx=1, my=1, w=*, x=*, y=*, . . . }. The message traverses the NOC of FPGA #0 until it is delivered to the remote router 816 of FPGA #0. A copy of the message is forwarded back into the NOC of FPGA #0 for delivery to all clients of that NOC. In some embodiments the message's 'mw' field is first reset to zero, so the message does not reattempt multicast. The message is also transmitted to the remote routers of the other FPGAs in the system, as described in the previous example. At the remote router of each FPGA, upon receipt of the multicast message, the message is forwarded into that FPGA's NOC. In some embodiments each message copy's 'mw' field is first reset to zero. At each FPGA, since each message copy is XY-multicast (i.e., mx=1, my=1), each FPGA's NOC delivers a copy of the message to each of its client cores.

In an embodiment, a multicast message traverses a graph of connected FPGAs, one by one. In an embodiment, a multicast message traverses the graph of connected devices in parallel, in a breadth first fashion. In an embodiment, a separate copy of the multicast message is sent by the first FPGA to each other FPGA. In an embodiment, a single copy of the multicast message is sent by the first FPGA to the next FPGAs in a spanning tree of connected FPGAs, and so forth across the spanning tree, so as to reduce the number of copies of the multicast message is sent by the first FPGA to each other FPGA.

The systems and methods disclosed herein address sending messages and multicast messages from a first client core on a first NOC via a first remote router in a first FPGA to a second client on a second NOC via a second remote router in a second FPGA. However, "on the internet nobody knows you are a dog," and particularly in the context of datacenters and worldwide distributed systems, made up of diverse computing devices, composed by internet networking, it is not necessary for both the sending and receiving devices to be implemented in an FPGA. In an embodiment the first client core, first NOC, and first remote router are implemented in an FPGA but the second client core is implemented in some non-FPGA device. In an embodiment the first client core is implemented in some non-FPGA device and the second client, second NOC, and second remote router are implemented in an FPGA.

In an embodiment, the first client core, first NOC, and first remote router are implemented in an FPGA, the message is transmitted by the first remote router via a NIC (network interface controller), but the message is received by, delivered to, or processed by any internet-connected computing device or integrated circuit. In an embodiment, any internet-connected computing device or integrated circuit may transmit a suitably formatted message over the network, which received by a remote router of an FPGA via a NIC; the message is then forwarded to a NOC of the FPGA, and delivered to a client core of the NOC.

Segmented Directional Torus NOCS

As Moore's Law continues to hold true, the resource capacity of FPGAs continues to double and redouble. Recently enormous FPGAs, such as the 1.2 M LUT, 2000 BRAM, 1000 UltraRAM Xilinx Virtex UltraScale+ XCVU9P device was adopted for use in data centers such as the Amazon AWS EC2 F1 instance type. Such an enormous device can be configured to implement a large parallel computer.

FIG. 12 is the die plot of such a FPGA multiprocessor system 1200, including 1680 32-bit RISC-V RISC processor cores, arrayed into 7 rows×30 columns of clusters of 8 cores each. In this embodiment, the clusters (e.g. cluster 1202 and cluster 1204) are interconnected by means of a NX=7× NY=30 Hoplite directional torus NOC 1206, represented by the 7×30 grid of white lines that span the figure.

While this system is functional and the NOC carries messages to and from the client cores (here, clusters) anywhere in the device, as the NOC grows ever larger (e.g., the Y rings have a diameter of 30 nodes), the latency to traverse the many nodes in the NOC tends to increase message delivery latency and also tends to reduce the realized routing bandwidth of the NOC. This is unfortunate because in some embodiments and in some workloads, most message delivery traffic is local and might otherwise take a short (few hop) path, staying close to the source client.

An embodiment of a segmented directional torus architecture, described herein, overcomes these latency and bandwidth problems. Such a torus architecture segments a long ring, such as the NY=30 Y-rings of FIG. 12, into smaller ring segments that are bridged by 'shortcut routers'. A shortcut router dynamically reroutes local messages to take a shortcut that routes them back to the local ring without having to traverse the full diameter of the ring. Thus, it becomes possible to treat the NX=7×NY=30 torus as six adjacent tori of dimension NX=7×NY=5, each with lower worst case local message delivery latencies. For messages sent and delivered to their destination from within a segment of the NOC, the latencies are reduced. For messages that necessarily span segments, or cross the full width or height of the NOC, latencies are about the same as before. In practice, for local message traffic patterns, this technique statistically increases the effective saturation injection rate of the 7×30 torus from about 14 messages per clock cycle to 42 messages per clock cycle, tripling realized bandwidth, and statistically achieves much lower typical and worst case message latencies for the same traffic patterns and injection rates.

Referring to FIG. 13A, an embodiment of a four terminal (two input messages, two output messages) shortcut router 1308 may be implemented to dynamically divide or compose a directional ring 1316 into a directional ring segment A 1300 and a directional ring segment B 1314. Each cycle, a message on ring A may arrive at input AI 1304 and a message on ring B may arrive at input BI 1312. If one or both of the messages at AI 1304 or BI 1312 are valid and destined for the other ring segment, then the ring segments are connected, and the AI message (if any, i.e., if valid) is forwarded to output BO 1310 and the BI message (if any) is forwarded to output AO 1302. Otherwise any AI message is forwarded to AO and any BI message is forwarded to BO, for this cycle separating the ring into the two ring segments A 1300 and B 1314. In typical operation, with mostly local message traffic, most cycles the rings are separated and work as smaller diameter rings.

FIG. 13B illustrates how multiple such shortcut routers may be used to partition directional X rings and directional Y rings in a directional 2D torus NOC. Here shortcut router 1324 and the other shortcut routers in that column partition each of the 8 X-rings in the 8×8 torus into two segments; in particular the X-ring [Y=0] is partitioned into segment 1322 and segment 1326. Here also shortcut router 1334 and the other shortcut routers in that row partition each of the 8 Y-rings in the 8×8 torus into two segments; in particular the Y-ring [X=0] is partitioned into the two ring segments 1332 and 1336.

FIG. 14A illustrates the circuit architecture block diagram of an instance of a shortcut router 1460, according to an embodiment. The router 1460 includes a routing circuit 1462 and a switch circuit 1464. The router has A segment message input AI 1468, B segment message input BI 1470, A segment message output AO 1484, and B segment message output BO 1486. Output message valid indicators (usually bundled with AO and BO) are herein designated AO.v 1480 and BO.v 1482. An embodiment of the switch circuit 1464 includes two multiplexers 1472 and 1476, which select the AO and BO outputs ahead of their respective output registers.

FIG. 14B is a diagram of an FPGA implementation of one switch element 1490 corresponding to one bit of the n-bit shortcut router switch 1464. The switch element 1490 is mapped into one dual-output 6-LUT 1491 followed by two flip-flops 1497 and 1498. The 6-LUT 1491 implements two multiplexers on one-bit inputs AI[i] 1494 and BI[i] 1495. The two multiplexer outputs are registered in the two flip-flops and are output as AO[i] 1497 and BO[i] 1498 as determined by the multiplexer select signal SEL 1496 which corresponds to the multiplexer select signal 1466 (14A).

The function of the routing circuit 1462 is to compute the multiplexer output select 1466. As described noted above, If one or both of the messages at AI 1304 or BI 1312 are valid and destined for the other ring segment, then the ring segments are connected, and the AI message (if any, i.e., if valid) is forwarded to output BO 1310 and the BI message (if any) is forwarded to output AO 1302. Otherwise any AI message is forwarded to AO and any BI message is forwarded to BO, for this cycle separating the ring into the two ring segments A 1300 and B1314, and this logic may be expressed by a simple flowchart diagram.

FIG. 15 is a flow diagram depicting the basic routing logic flow for a shortcut router that spans two ring segments A and B, according to an embodiment. Each cycle, for each pair of input messages AI and BI, the routing circuit 1462 (FIG. 14A) determines 1502 whether AI has a destination address that lies on the B segment, and determines 1504 whether BI has a destination address that lies on the A segment. If either condition is true, it performs an inter-segment route 1508 that forwards AI to BO and BI to AO. Otherwise it performs an intra-segment route 1506 that forwards AI to AO and BI to BO. For example, if AI has a destination that lines on the B segment, but BI has a destination that lies on the B segment, the router still forwards AI to BO and forwards BI to AO so that BI is not "lost" and so as to preclude message delivery deadlock or livelock.

FIG. 16 presents an embodiment of the routing logic for a shortcut router at address (x,y), i.e., that spans two ring segments A and B. If the router spans two X-ring segments, the routers on the X-ring segment coupled to its AI message input port and AO message output port have X coordinates less than x, and the routers on the X-ring segment coupled to its BI message input port and BO message output port have X coordinates greater than or equal to x. If the router spans two Y-ring segments, the routers on the Y-ring segment coupled to its AI message input port and AO message output port have Y coordinates less than y, and the routers on the Y-ring segment coupled to its BI message input port and BO message output port have Y coordinates greater than or equal to y.

In an example, input messages AI and BI and output messages AO and BO each include a respective message valid indicator and a respective destination address. Each cycle, for each AI and BI, the router determines how to route AI and BI to AO and BO, depending upon 1602 whether the shortcut router is coupled to two X-ring segments or two Y-ring segments. If the shortcut router is coupled to two X-ring segments, the router tests 1604 whether AI is valid and has a destination address X coordinate that is greater than or equal to x, and tests 1606 whether BI is valid and has a destination X coordinate that is less than x. If either or both are true, it performs an inter-segment route 1612, otherwise an intra-segment route 1614. If the shortcut router is coupled to two Y-ring segments, the router tests 1608 whether AI is valid and has a destination address Y coordinate that is greater than or equal to y, and tests 1610 whether BI is valid and has a destination X coordinate that is less than x. If either or both are true, the router performs an inter-segment route 1612, otherwise an intra-segment route 1614. An inter-segment route 1612 forwards AI to BO and BI to AO. An intra-segment route 1614 forwards AI to AO and BI to BO.

In terms of the shortcut router circuit of FIG. 14A, the routing function circuit 1462 receives the two input signals AI 1468 and BI 1470. In response to the valid indicator and destination address coordinates of two input messages, using the logic of flowchart steps 1602-1612, the router circuit 1462 outputs a multiplexer select signal 1466, which causes multiplexers 1472 and 1476 to output either AI or BI to the input of the AO output register 1474, coupled to the AO output 1484, and either BI or AI to the input of the BO output register 1476, coupled to the BO output 1486.

In an embodiment, shortcut router 1460 is a purely combinational circuit sans clocking or input or output registers. In an embodiment, shortcut router 1460 registers inputs AI and BI in input registers instead of registering outputs AO and BO in output registers. In an embodiment, shortcut router 1460 registers inputs AI and BI in input registers and registers outputs AO and BO in output registers. In an embodiment, the routing logic circuit 1462 registers the output valid signals AO.v 1480 and BO.v 1482. In an embodiment, the routing logic circuit 1462 registers and reregisters (i.e., using two cycles of pipeline delay) the output valid signals AO.v 1480 and BO.v 1482.

In an embodiment, the X or Y destination segment tests 1604-1610 are simple table lookups instead of arithmetic comparisons of coordinates. In an embodiment wherein each message destination address is specified using a router index instead of an (x,y) coordinate, the A segment or B segment determination is performed by indexing a table of Boolean values, indexed by the router index, wherein each indexed table entry is 0 if the router with corresponding index lies on the A segment, 1 if lies on the B segment.

For example, an X-ring in a 2D directional torus has four NOC routers with router indices, 1, 3, 2, 4, in that order; and the X-ring is segmented into two X-ring segments (A and B) by means of a shortcut router between routers 3 and 2. In this example, a mathematical function involving coordinate comparisons (i.e., is the router index less than or equal to something?) may not be able to correctly determine to which ring segment a message with a destination router-index-no. should be forwarded. In an embodiment however, each shortcut router has a table for mapping router indices to ring segments. A table {1→A, 2→B, 3→A, 4→B} or more simply {1→0, 2→1, 3→4→1} indicates that if an AI or BI input message's destination router index is 1 or 3, its destination lies along segment A, otherwise segment B.

In an embodiment, a ring may be partitioned into n>2 ring segments by means of n−1 shortcut routers. For example, as discussed above with respect to segmenting the NX=7× NY=30 NOC 1206 of FIG. 12 into e.g. 6 NOC segments each NX=7×NY=5, each of the seven 30-router Y-rings is segmented into six 5-router Y ring segments by means of adding five shortcut routers per Y-ring, one shortcut router inserted between every group of five Hoplite routers, on each of the seven Y-rings.

For example, an X-ring (for the row Y=1) in a 2D directional torus has six NOC routers (0,1), (1,1), (2,1), (3,1), (4,1), (5,1), in that order, and the X-ring is segmented into three X-ring segments (herein called first segment, second segment, third segment) by means of a first shortcut router between routers (1,1) and (2,1) and a second shortcut router between routers (3,1) and (4,1). The first shortcut router might use tests (AI.x<2) and (BI.x<2) to determine if either or both of the AI or BI inputs of the first shortcut router is destined for the first segment, or otherwise for the second segment (or beyond to the third segment). Similarly the second shortcut router might use tests (AI.x<4) and (BI.x<4) to determine if either or both of the AI or BI inputs of the second shortcut router is destined for the second segment (or beyond to the first segment), or otherwise for the third segment.

FIG. 17 illustrates that a disclosed router, NOC, or system design, after processing by FPGA implementation tools, is manifest in an FPGA configuration bitstream file; the file is stored in a configuration FLASH memory or similar computer readable medium; the configuration bitstream is conveyed to the FPGA, via its configuration port, and then to its configuration system, in order to load the bitstream file internally and to configure the device's myriad programmable logic elements and interconnect fabric, in order that the FPGA circuitry is configured as the disclosed router, NOC, or system.

In some embodiments, the disclosed router, NOC, client cores, or system may be implemented in an FPGA. To implement a specific circuit or function, such as the disclosed routers, NOC, or system, an FPGA is configured by means of configuration circuit. The configuration circuit loads a data file known as a configuration bitstream. A configuration bitstream is a special kind of firmware for FPGAs that determines the settings of the millions of configuration cells in the device. Each configuration cell controls some aspect of the programmable logic device. Some configuration cells form the truth tables of the FPGA's lookup table programmable logic gates. Some configuration cells control the pass gates and multiplexer select lines that form the programmable interconnect fabric to selectively route one gate's output to the specific inputs of specific other gates. Most FPGA devices employ CMOS memory cells for configuration cells. This memory is volatile; should the FPGA ever be powered down, its configuration memory is lost and, just as with a conventional computer, upon power up the configuration bitstream file is then reloaded from another source, often a non-volatile memory device, such as a FLASH memory chip. Other FPGA devices may employ non-volatile configuration cells, for example, flash memory cells, so that once they are initially programmed with a configuration, the configuration is retained across power cycles. Even in these devices, though, a configuration bitstream file is loaded or downloaded at least once to implement the specific desired logic design or system.

As illustrated in FIG. 17, a system 1700 includes an FPGA 1710, a flash device within which is stored the FPGA's configuration bitstream file, and various external device and interfaces such as Ethernet networks, DRAM memory, and PCI Express hosts. At power up, the FPGA is unconfigured and cannot yet perform a useful function. Using its config port 1720 it loads, bit by bit, byte by byte, the configuration bitstream file data from the configuration bitstream flash memory 1724 over the configuration signals bus 1722, into the FPGA's configuration port 1720. This circuit loads the bitstream, optionally checks it for validity, optionally decrypts it, and loads it bit by bit into the configuration cells across the FPGA. When the entire configuration bitstream has been loaded and the FPGA's configuration cells have been initialized, then FPGA wakes up configured as the disclosed router, NOC, or system.

Applications

Some applications of an embodiment of this system include, without limitation, 1) reusable modular "IP" NOCs, routers, and switch fabrics, with various interfaces including AXI4; 2) interconnecting FPGA subsystem client cores to interface controller client cores, for various devices, systems, and interfaces, including DRAMs and DRAM DIMMs, in-package 3D die stacked or 2.5D stacked silicon interposer interconnected HBM/WideIO2/HMC DRAMs, SRAMs, FLASH memory, PCI Express, 1G/10G/25G/40G/100G/400G networks, FibreChannel, SATA, and other FPGAS; 3) as a component in parallel-processor overlay networks; 4) as a component in OpenCL host or memory interconnects; 5) as a component as configured by a SOC builder design tool or IP core integration electronic design automation tool; 4) use by FPGA electronic design automation CAD tools, particularly floor-planning tools and programmable-logic placement and routing tools, to employ a NOC backbone to mitigate the need for physical adjacency in placement of subsystems, or to enable a modular FPGA implementation flow with separate, possibly parallel, compilation of a client core that connects to the rest of system through a NOC client interface; 6) use of floor-planned NOCs in dynamic-partial-reconfiguration systems to provide high-bandwidth interconnectivity between dynamic-partial-reconfiguration blocks, and via floor planning to provide guaranteed logic- and interconnect-free "keep-out zones" for facilitating loading new dynamic-logic regions into the keep-out zones, and 7) use of the disclosed router and NOC system as a component or plurality of components, in computing, datacenters, datacenter application accelerators, high-performance computing systems, machine learning, data management, data compression, deduplication, databases, database accelerators, networking, network switching and routing, network processing, network security, storage systems, telecom, wireless telecom and base stations, video production and routing, embedded systems, embedded vision systems, consumer electronics, entertainment systems, automotive systems, autonomous vehicles, avionics, radar, reflection seismology, medical diagnostic imaging, robotics, complex SOCs, hardware emulation systems, and high frequency trading systems.

In an embodiment, the disclosed system and methods may be used to compose multiple cited GRVI Phalanx 1200 (FIG. 4, FIG. 12) massively parallel RISC-V accelerator FPGA overlays systems into an enormous parallel computer with uniform message passing throughout. For example, by implementing one large GRVI Phalanx instance in each of the eight FPGAs in the FIG. 7, and connecting them together by means of the disclosed remote routers 816 (FIG. 8), using inter-FPGA links 812 forming a ring, or using the PCIe interfaces 822 and PCIe switch 824, any processor 420 or accelerator 450 in any cluster 410 may exchange messages via a NOC router 400 with any other core in any other FPGA 800, 802, 832, 830, etc. In such a system, each FPGA implements approximately 1250 32-bit RISC-V cores, and in aggregate the eight FPGA system provides 10,000 cores with uniform message passing and shared access to 32 DRAM channels total 512 GB of memory.

In an embodiment, multiple instances of this system may be launched in an "elastic compute cloud" datacenter web services environment and networked together to form a massive distributed system with hundreds of thousands of cores. In an embodiment, one hundred machine instances of the eight FPGA system may be launched. Across machine instances, core to core messaging may occur by means of routing the message from the client core, over the NOC, to the remote message router 910 (FIG. 9), the routing table 926 directing the message to a remote router accessed by sending network packets over the datacenter network. In an embodiment (FIG. 1), the remote router 182 is coupled to the NIC 140, coupled to the ethernet PHY, coupled to the datacenter network 107, and the message may be send directly by the NIC 140. In an embodiment (not shown), the remote router sends the message over the network by means of performing a DMA transfer of a message data packet and NIC command packet to a PCIe NIC (not shown), indirectly coupled to the FPGA by a PCIe interface controller 142 and a PCIe switch 112. In an embodiment a representative one hundred instance distributed system has, in aggregate, one million 32-bit RISC cores across 800 FPGAs, 100 TB of host DRAM, and 50 TB of FPGA DRAM, accessed across 3200 DRAM channels.

In an embodiment, DRAM accesses are implemented by a client core sending a DRAM read or write request, over a NOC, to a DRAM controller bridge client core, coupled to the NOC and coupled to a DRAM controller, coupled in turn to a bank of external dynamic RAM or on-chip HBM high bandwidth DRAM. In response to receiving a read or write request message, a DRAM controller bridge may perform the requested read or write transaction via its DRAM controller. In response, a DRAM controller bridge may send a write response or read data response message (or series of messages, for a burst transfer) back to the client that made the request. Alternatively the read or write request may specify another client core (at another destination address) should receive the read or write response message(s). In an embodiment applying the disclosed system and methods for sending and receiving remote messages across FPGAs, any core in any FPGA may perform a remote DRAM write or read request to any DRAM controller bridge in any other FPGA in the same machine instance, or even to any DRAM controller bridge in another FPGA in any other machine instance, over the network, and may similarly receive read or write response messages back across the same inter-FPGA channels.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure. Furthermore, "connect" and "couple, and their various forms, are used interchangeably to mean that there can be one or more components between two other components that are "connected" or "coupled" to one another.

The invention claimed is:
1. An apparatus, comprising:
a first field programmable gate array (FPGA) including a first remote router, a first client core, and a first network on a chip communicatively coupled to the first remote router and to the first client core; and
a second FPGA including a second remote router, a second client core, and a second network on a chip communicatively coupled to the second remote router and to the second client core,
the second FPGA configured to send a message from the second client core to the first client core by causing the message to travel from the second client core, to the second network on a chip, to the second remote router, to the first remote router, to the first network on a chip, and to the first client core,
wherein the first client core includes a random-access memory.

2. The apparatus of claim 1, wherein the second client core includes or is communicatively coupled to a memory interface core.

3. The apparatus of claim 1, wherein the second client core includes or is communicatively coupled to a network interface core.

4. The apparatus of claim 1, wherein the second client core includes or is communicatively coupled to a Peripheral Component Interconnect (PCI) Express interface.

5. The apparatus of claim 1, wherein the second client core includes or is communicatively coupled to a bridge to an interconnection network.

6. The apparatus of claim 1, wherein the second client core includes or is communicatively coupled to an Advanced eXtensible Interface AXI4-Stream bridge core.

7. The apparatus of claim 1, wherein the second client core includes or is communicatively coupled to an Advanced eXtensible Interface AXI4-Memory-Mapped bridge core.

8. The apparatus of claim 1, wherein the second client core includes or is communicatively coupled to a processor core.

9. The apparatus of claim 1, wherein the second client core includes or is communicatively coupled to a cache memory controller.

10. The apparatus of claim 1, wherein the second client core is communicatively coupled via a coherent memory system to a processor.

11. The apparatus of claim 1, wherein the first client core includes or is communicatively coupled to an FPGA reconfiguration circuit.

12. The apparatus of claim 1, wherein the second client core includes or is communicatively coupled to an embedded Digital Signal Processor (DSP) block.

13. A method, comprising:
    sending a message from a second client core to a first client core by causing the message to travel from the second client core, to a second network on a chip, to a second remote router, to a first remote router, to a first network on a chip, and to the first client core.

14. A tangible non-transitory machine readable medium storing configuration data, that, when loaded into a field programmable gate array (FPGA), causes the FPGA to instantiate a circuit, including a second remote router, a second client core, and a second network on a chip communicatively coupled to the second remote router and to the second client core, configured:
    to send a message from the second client core to a first client core by causing the message to travel from the second client core, to the second network on a chip, to the second remote router, to a first remote router, to a first network on a chip, and to the first client core.

* * * * *